United States Patent [19]
Nelson et al.

[11] Patent Number: 5,455,729
[45] Date of Patent: Oct. 3, 1995

[54] MULTI-CHANNEL ROTATING TRANSFORMER

[75] Inventors: Gary T. Nelson, Carlsbad; Robert R. Heinze, San Diego, both of Calif.

[73] Assignee: Conner Peripherals, Inc., San Jose, Calif.

[21] Appl. No.: 114,492

[22] Filed: Aug. 30, 1993

[51] Int. Cl.$^6$ .................................................. G11B 5/52
[52] U.S. Cl. ................................................... 360/108
[58] Field of Search .......................... 360/108; 336/120, 336/122–125

[56] References Cited

U.S. PATENT DOCUMENTS

| | | | |
|---|---|---|---|
| 4,099,210 | 7/1978 | Dolby | 360/108 |
| 4,139,871 | 2/1979 | Yoshida et al. | 360/108 X |
| 4,791,514 | 12/1988 | Huijer et al. | 360/108 |

OTHER PUBLICATIONS

H. Inoue and Y. Okada, *Finite Element Analysis of Crosstalk in a Rotary Transformer for VCR's*, I.E.E.E. Transactions On Magnetics, vol. 27, No. 5, Sep. 1991, pp. 3931–3934.

*Primary Examiner*—A. J. Heinz
*Attorney, Agent, or Firm*—Fliesler, Dubb, Meyer & Lovejoy

[57] ABSTRACT

A transformer comprising a rotor and a stator. The rotor is positioned for rotation about a rotational axis and having a plurality of windings. At least one of said plurality of windings is positioned at a first radial distance from the rotational axis, and at least another of said plurality of windings is positioned at a second radial distance from the rotational axis. The stator has at least two windings, a first of said at least two stator windings being provided at said first radial distance, and at least a second of said windings being provided at said second radial distance from said rotational axis. Alternating ones of said plurality of rotor windings inductively couple to alternating ones of said at least two stator windings as said rotor rotates about said axis.

21 Claims, 17 Drawing Sheets

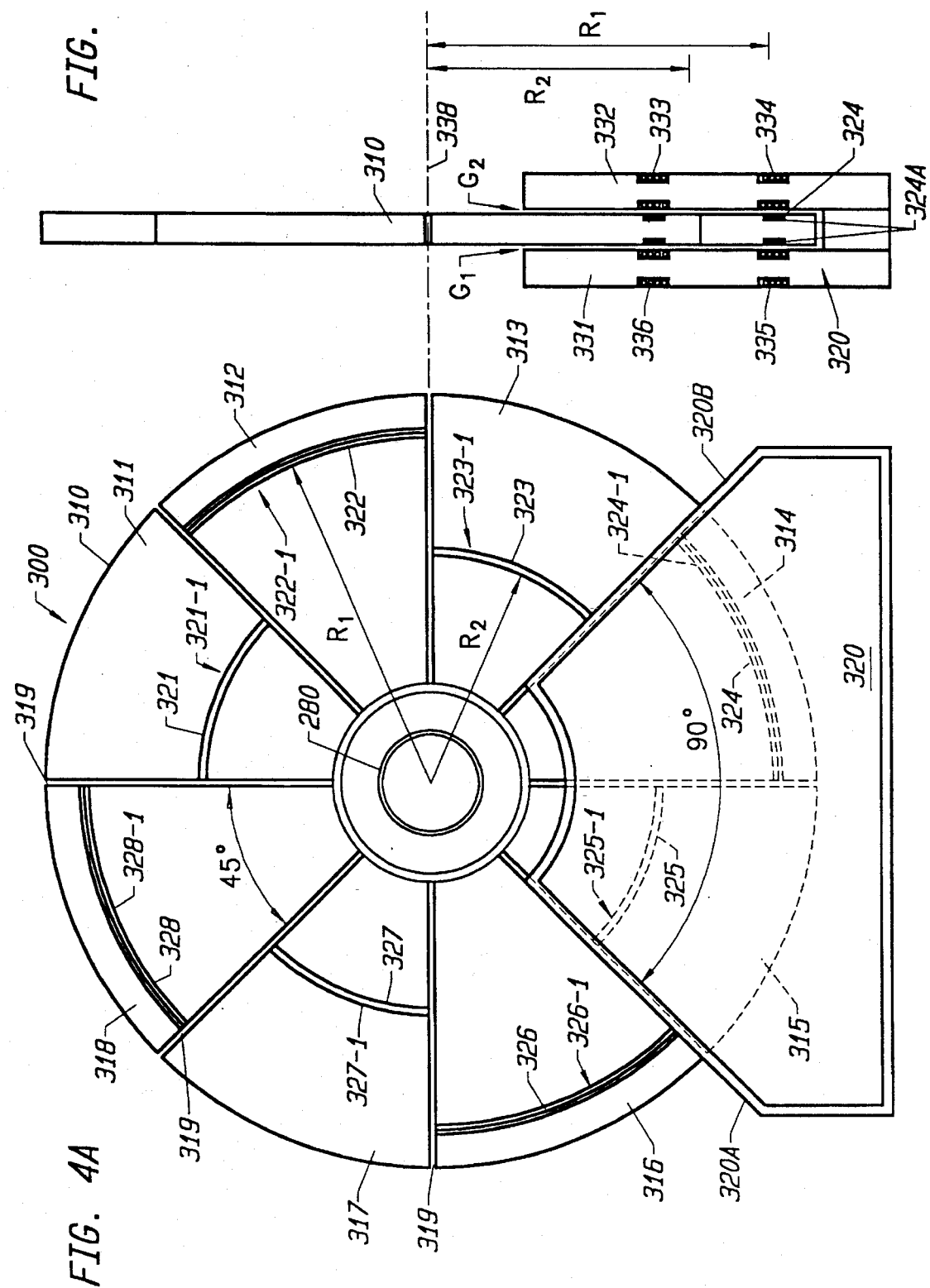

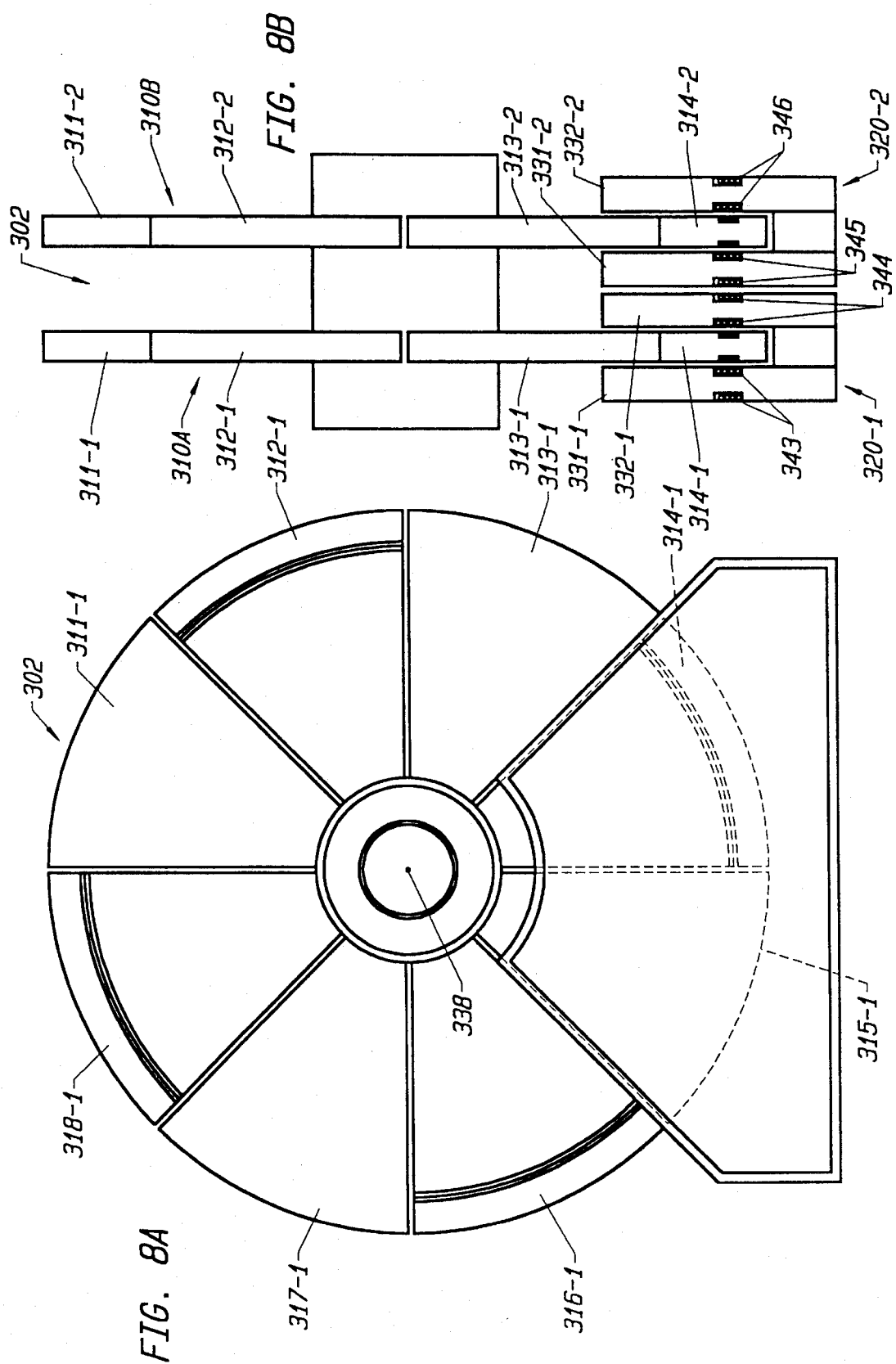

MULTI-CHANNEL ROTATING TRANSFORMER

CROSS-REFERENCE TO RELATED APPLICATION

ARCUATE SCAN TAPE DRIVE application Ser. No. 08/113,996, filed Aug. 30, 1993, inventors John M. Rottenberg, Joseph Lin, Robert H. Pierce, Richard Milo, and Michael Andrews, owned by the assignee of the instant application and is hereby incorporated by reference.

BACKGROUND OF THE INVENTION

1. Field of the Invention

The invention relates to rotary transformers suitable for use in applications such as video, audio and data tape recording devices wherein multiple recording heads on a rotating drum must be electrically coupled to fixed electronic circuitry.

2. Description of the Related Art

Certain types of recording technology require electrical coupling between a rotating drum, carrying a plurality of reading and recording heads, to fixed electronic circuitry which interprets signals read by the heads and which controls recording by supplying current to the heads. The circuitry is generally provided at some point adjacent to the rotating drum, with signals read from the recording medium and signals for recording (or writing) information to the storage medium being transferred to and from the rotating drum by means of a rotary transformer.

Typically the rotary transformer is comprised of two circular plates, each with a plurality of windings. One of the plates and its associated windings comprises the transformer primary while the other comprises the transformer secondary. Each pair of windings may comprise a read channel, a write channel, or both. The transformer is designed with the goal of providing isolation between the respective channels during coupling of the electrical signals from one plate/winding to the opposing plate by magnetic inductance so that channel cross-talk is minimized.

A typical rotary transformer is shown in FIGS. 1A and 1B. FIGS. 1A and 1B are reproductions of two drawings shown in FIG. 1 in H. Inoue and Y. Okada, Finite Element Analysis of Crosstalk in a Rotary Transformer for VCR's, I.E.E.E. Transactions On Magnetics, Vol. 27, No. 5, September 1991, pp. 3931–3934. As shown therein, a conventional transformer 40 includes a first, rotating plate 20 positioned parallel to and coincident with a second, stationary plate 30. Stationary plate 30 is separated from rotating plate 20 by an air gap A of about 3 milli-inches. Each plate 20,30 includes five grooves: 22, 24, 25, 26, 28, on plate 20; and 32, 34, 35, 36, 38 on plate 30. Windings 21, 23, 27, 29 and windings 31, 33, 37, 39, are respectively provided in grooves 22, 24, 26, 28 and 32, 34, 36, 38. In alternative embodiments, central grooves 25, 35, would also include a winding, but in the embodiment shown in FIGS. 1A and 1B, these central grooves 25,35 are left without windings to enhance channel isolation, as discussed herein. Plates 20 and 30 may be typically manufactured from ferrite, such as Ni-Zn ferrite.

Four separate electrical channels are provided by rotary transformer 40. Each channel is defined by a pair of windings as follows: channel 1, windings 21 and 31; channel 2, windings 23 and 33; channel 3, windings 27 and 37; and channel 4, windings 29 and 39. Typically, fixed-side windings 31, 33, 37, 39 have six turns each, while rotating side windings 21, 23, 27, and 29 having three turns each. As will be understood by one skilled in the art, when an alternating current source is coupled to one of fixed-side windings 31, 33, 37, 39, inductive coupling occurs between the winding and the corresponding rotating side windings 21, 23, 27, and 29. The same is true when a signal is induced by the recorded signal from the storage medium and supplied to the secondary windings for transfer to the primary windings.

In all systems utilizing multi-channel rotary transformers, it is desirable to reduce cross-talk between the respective channels and provide good channel isolation so that signals on one particular channel will not be imparted to another channel. In a video recorder, for example, four heads—each coupled to a single transformer channel—are used to scan over the surface of a helically wound tape over the rotating surface of a cylindrical drum. (This is typically known as "helical scan" tape recording.) In a helical scan system, each of the four heads will be separated on the drum at equidistant points, 90° apart. As such, while only one head is dedicated to recording information at any particular point in time, usually more than one head will be in contact with the tape. If any cross-talk between the transformer coils is present, an undesired signal may be imparted to one or more heads in contact with the tape at the same time as the read or write dedicated head. Some such systems have incorporated the use of a multi-channel pre-amplifier circuit to eliminate cross-talk; however such circuits increase the complexity and the cost of the overall application in which they are used.

Thus, channel windings are deposited in grooves 22, 24, 26, 28, and 32, 34, 36, and 38 in each plate to improve isolation between the channels. A minimal amount of ferrite is disposed between the windings. As the diameter of the elements becomes smaller, the winding-to-winding spacing, and hence the width of the ferrite between the grooves, decreases. In some designs, alternating grooves will be left vacant to increase isolation between the channels by increasing the flux path which must be traversed to establish any coupling. Yet another common alternative, (as described in Finite Element Analysis of Crosstalk in a Rotary Transformer for VCR's), is to provide a shorting ring 42 between the respective windings in a vacant groove, in this case central groove 25, to improve isolation between the channels.

An additional concern in rotary transformers is the commutative efficiency level of each of the channels. As noted above, windings on the rotating element have fewer turns than those on the stationary element in accordance with the well known principle that the ratio of turns in transformer winding is proportional to the voltage induced in the primary or secondary windings $n_s/n_p=V_s/V_p$. In conventional rotary transformers, all turns being equal from channel-to-channel, there is greater inductance between channels with greater area—those at the outermost diameter of the plates. In a number of rotary transformer applications, particularly applications involving data storage and retrieval, uniformity in channel-to-channel performance is highly desirable. While channel-to-channel uniformity may sometimes be achieved through modification of the pre-amplifier circuitry, this solution has limited effectiveness. Further, mechanical solutions, such as increasing the turns per winding at the smaller diameter of windings, have been more problematic. Specifically, limited winding area is available at smaller diameter grooves, especially if a design goal is to limit the overall size of the transformer.

Such conventional rotary transformer designs are also inherently difficult to manufacture. First, the magnetic core material must be either cast as an integral piece with grooves, or the grooves machined from a single piece of core material. Machining of rotary transformers having a total edge to edge diameter on the order of less than one inch is problematic and costly. After machining, the wires for the windings must be circumferentially wound in the grooves. When a large number of transformer channels (and hence grooves) are required, the process naturally becomes more difficult and time consuming.

Miniaturization of the conventional rotary transformer design is also problematic. The dimensions of the multi-channel rotary transformer are limited by manufacturing tolerances and the cross-sectional area of the core material between the windings. In addition, a minimal amount of winding area is necessary to provide effective read voltage coupling in applications such as VCR's and tape data storage units.

As noted above, rotary transformers find application in tape drive data storage units. In such applications, channel-to-channel efficiency, transformer manufacturability, and optimal channel performance are significant factors in improving overall drive performance and reducing the total cost of manufacture. U.S. patent application Ser. No. 07/898,926, entitled Arcuate Scanning Tape Drive, filed Jun. 12, 1992, by J. Lemke (hereafter "the Lemke application") discloses a relatively compact tape drive for recording and playing back a data tape having a storage capacity of approximately 10 gigabytes, which storage capacity is higher than that previously obtained with either longitudinal or helical recording. FIGS. 2A, 2B, 3A, 3B and 3C are reproductions of FIGS. 1, 2, 7, 8A and 8B, respectively, of the Lemke application. The Lemke application discloses a tape drive 110 including a plurality of heads 135 placed on the front circular face of a rotating drum 130, with the axis of rotation 138 of the rotating drum 130 being perpendicular to and intersecting with the longitudinal axis of the advancing tape 118. As the tape 118 advances from the right to the left (in FIG. 2b) and the drum rotates in a counterclockwise direction, the heads 135 trace arcuately-shaped data tracks substantially transverse to the longitudinal axis of the tape. Arcuate scan recording has been known for some time, but has been disfavored due to the lack of effective servoing schemes for accurately maintaining alignment of the heads with the arcuate data tracks. Another reason arcuate scan recording has been disfavored is that existing head/tape engagement mechanisms employed in arcuate scan tape drives, such as a backing plate for urging the tape against the head, often caused damage to the heads and/or tape in a relatively short period of time.

The head mechanism in the Lemke application includes at least one read, write and servoing head 135 mounted on the front face of the rotating drum. The drive further includes a dual adjustment servoing scheme to maintain head/track alignment in response to servo feedback signals.

In arcuate scan tape drives, such as those disclosed in the Lemke and instant applications, it is also difficult to provide effective coupling of the heads to the control circuitry. It is imperative that performance of the rotary transformer in such drives be optimal for each head channel and that each head channel have equivalent performance characteristics. The transformer scheme disclosed in the Lemke application is shown in FIG. 3A.

FIG. 3A is a perspective, cutaway view showing the transduction architecture of the rotary head assembly 130 of the arcuate scan drive disclosed in the Lemke application. In the exemplary 3-head architecture of the embodiment illustrated in FIG. 3A, the read, write, and servo head assemblies are arranged in counterclockwise sequence on the side surface of a transducer drum 200. The three heads are substantially identically constructed in all essential respects except for the width and radial position on the drum face. Each head assembly includes a transducer support block, such as the read support block 202$b$, attached to the side cylindrical surface of the transducer drum by a threaded screw, such as screw 202$c$. Each transducer support block carries a two winding transducer. The read transducer is indicated by reference numeral 202$a$, the write transducer by reference numeral 204$a$, and the servo transducer by reference numeral 206$a$. In practice, drum 200 is slotted along its side to accept the transducer support block so that the transducers are positioned near the outer periphery of the face of each drum.

The Lemke application notes that it would be possible to serve all three of the transducers in FIG. 3A by single channel rotary transformer having a rotor mounted winding and a stator mounted winding. However, as noted therein, this would necessitate the provision of switched electronics to effectively provide separate read, write, and servo channels. However, the combination of impedance effects exhibited by a single multi-functional rotary transformer and the artifacts of electronic switching would increase channel noise. Accordingly, separate, dedicated rotary transformer is utilized for each head. A read head rotary transformer consisting of a rotor mounted winding/core piece 212 and a stator mounted winding/core piece 222 is shown. The rotor piece 212 is connected to the read transducer 202$a$ by a twin lead signal path 212$a$. The write head 204 is served by a rotary transformer consisting of a write rotor-mounted winding/core piece 214 and a stator-mounted winding/core piece 224. The rotor piece 214 is connected to the right transducer 204$a$ by a twin-lead signal path 214$a$. Lastly, the servo head is connected by a twin-lead signal path 216$a$ to a servo rotor-mounted winding/core piece 216 which operates in conjunction with a servo stator-mounted winding/core piece 226.

Stator pieces 222, 224 and 226 are mounted in a fixed manner on a portion (not shown) of the rotor head assembly 160. Each stator piece includes a substantially arcuately-shaped core section, which corresponds with the shape of the tracks produced and read back by the apparatus described in the Lemke application. The transducer drum 200 is mounted for counterclockwise rotation on shaft 208. In this embodiment, the rotary transformers are essentially equivalently constructed. In this regard, both the rotor and stator pieces are quadripole devices whose electromagnetic operation cancels any effects caused by external fields. Each transformer consists of a rotor and stator piece located at essentially the same radial distance but at different circumferential location as its companion piece. It is contemplated that the functions performed by these transformers could be accomplished with a set of coaxial circular transformers, one for each head. However, the cost for the configuration would be higher than the cost for the configuration illustrated in FIG. 3A.

The use of separate dedicated rotary transformers with stationary windings necessitates the positional relationships illustrated in FIGS. 3B and 3C. (Note that in FIG. 3A, the winding/core pieces are illustrated and described; however, FIGS. 3B–3C illustrate the relative core positions.) As shown, the three stator pieces 222, 224, and 226 are disposed to occupy arcuate sections of a single circular plane which is parallel to, and concentric with, respective circular planes occupied by the rotor pieces 212, 214 and 216, and the transducers 202a, 204a, and 206a. The orientation of these components with respect to a tape at the record/playback location is illustrated in FIG. 3B. In FIG. 3B, a tape 230 having an upper edge 231 and a lower edge 232 is transported from right to left, while the transducer drum with the transducers and rotary windings disposed thereon rotates in a counterclockwise direction at a center of rotation 138. Ideally, the center of rotation 138 falls on the center line 234 of the tape 230 during record/readback. The stator pieces 222,224, and 226 are spaced arcuately from each other by distances adequate to ensure that they are not bridged by the cores of the rotary pieces. The stator pieces are permanently positioned such that the upper left corner of the stator piece 224 is substantially aligned with the upper edge 231 of the tape. The arcuate span of the write stator piece 224 extends from the upper edge 231 across the lower edge 232 of the tape 230. Assume now that as the transducer drum 200 rotates counterclockwise, the write transducer 204a and write rotor piece 214 have the positions illustrated in FIG. 3B. Application of a write current to the winding of stator piece 224 will generate a field which is coupled to the rotor piece 214, causing current to be conducted therefrom to the transducer 204a, enabling the write transducer to record an arcuately shaped track on the tape 230.

When the transducer drum has rotated in a counterclockwise direction far enough to enable the write transducer 204a to record a full track, the read transducer 202a must be positioned to begin reading the track just written in order to support read-after-write validation. This is shown in FIG. 3C. However, the physical channelization of the write and read functions in the rotary transformer prevents the use of the write stator winding 224 to couple the readback signal. Instead, this is provided in the read stator winding 222. As FIGS. 3B and 3C illustrate, the read stator winding 222 is displaced in the forward arcuate scanning direction from the write stator winding 224. Further, the read rotor winding 212 is located on the transducer drum forward of the write rotary winding 214 in the scanning direction by an arcuate distance sufficient to align it with the read stator winding 222 when the read transducer 202a is positioned at the beginning of a track.

The transformer disclosed in the Lemke application requires three separate rotor coils and three separate stator coils (e.g., two coils per channel) for the particular arcuate scan head assembly shown therein. The transformer scheme requires precise positioning of the rotor and stators for signal coupling, and, according to the application, sacrifices manufacturability for performance. In addition, the size of the transformer scheme in the Lemke application is difficult to reduce, making the system cumbersome in the small confines of the form factors generally associated with tape data storage units. In addition, this scheme makes it difficult to alter the number of channels since a minimum physical area is required for each channel to ensure signal coupling.

SUMMARY OF THE INVENTION

Thus an object of the invention is to provide a multichannel rotary transformer having superior performance characteristics for use in numerous applications.

Another object of the invention is to provide a rotary transformer having superior performance characteristics in a reduced size.

A further object of the invention is to provide a multichannel rotary transformer having improved channel isolation over prior art rotary transformers.

Yet another object of the invention is to provide a multi-channel rotary transformer in which all channels have approximately the same signal induction efficiency.

Another object of the invention is to improve the commutative efficiency of all channels of the multichannel transformer.

A further object of the invention is to provide a transformer which allows simplification of the preamplifier used therewith in recording applications.

Yet another object of the invention is to provide a rotary transformer design having the above objects and further allowing for variation in the number of channels.

These and other objects of the invention are provided in a multi-channel rotary transformer generally including a first element, having a first element winding, and a second element having a plurality of windings. The first or second element is rotationally positional such that each of the plurality of windings may be positioned adjacent said first element winding, wherein only one of the plurality of windings on the second element interacts with said at least one winding on the first element at a given time. In one embodiment, the first element is stationary comprising a stator, and the second element is mounted for rotation about a rotational axis thus comprising a rotor. The rotor includes a plurality of sector shaped blades, each blade including one of the plurality of windings positioned at a first or a second distance from the rotational axis. The stator may include a second winding, with the first element winding positioned at the first distance from the rotational axis and the second winding positioned at the second distance from the rotational axis.

In another aspect, alternating ones of the plurality of windings on the rotor are placed on the blades at the first distance and the second distance, respectively.

In still another aspect, alternating ones of said blades having windings at the first distance have an undercut region in said blade at the second distance creating a larger air gap between the undercut region and the stationary element winding at the second radius.

In a further embodiment each blade has an outer arcuate edge at a radial distance from the rotational axis, and those blades having a winding at the first distance from the rotational axis have an outer arcuate edge at a first radius from said rotational axis, while those blades having a winding at the second distance from said rotational axis have an outer arcuate edge at a second radius from said rotational axis, the second radius being shorter than the first (longer) distance to the windings. An additional aspect of such embodiment is that the windings positioned at the first distance from the rotational axis are at a greater distance from the rotational axis than the edges extending to the second radius.

BRIEF DESCRIPTION OF THE DRAWINGS

The invention will be described with respect to the particular embodiments thereof. Other objects, features, and advantages of the invention will become apparent with reference to the specification and drawings in which:

FIGS. 4A and 4B are side and cross-sectional views of a first embodiment of a rotary transformer in accordance with the present invention.

FIGS. 8A and 8B are side and cross-sectional views of a third embodiment of the rotary transformer of the present invention utilizing two rotors and two stators.

DESCRIPTION OF THE PREFERRED EMBODIMENTS

Figure 1A:
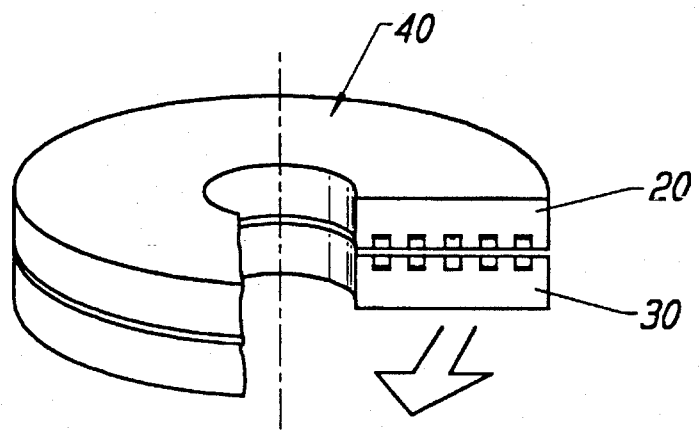
FIGS. 1A and 1B are three-dimensional and a cross-sectional views, respectively, of a rotary transformer typically used in video tape recording systems.
Figure 1B:
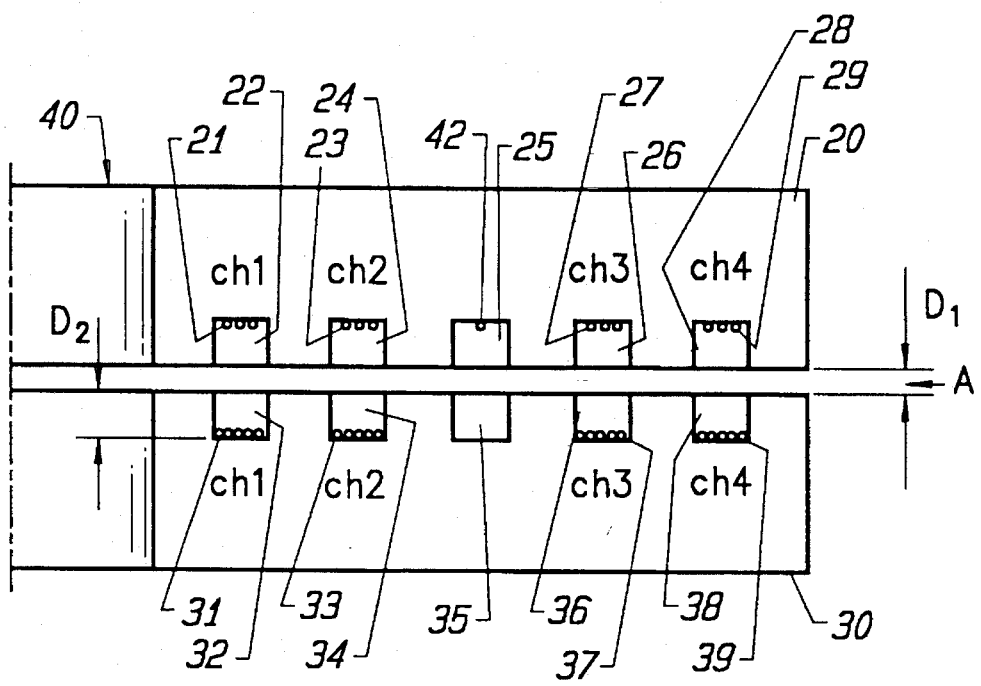
Figure 2A:
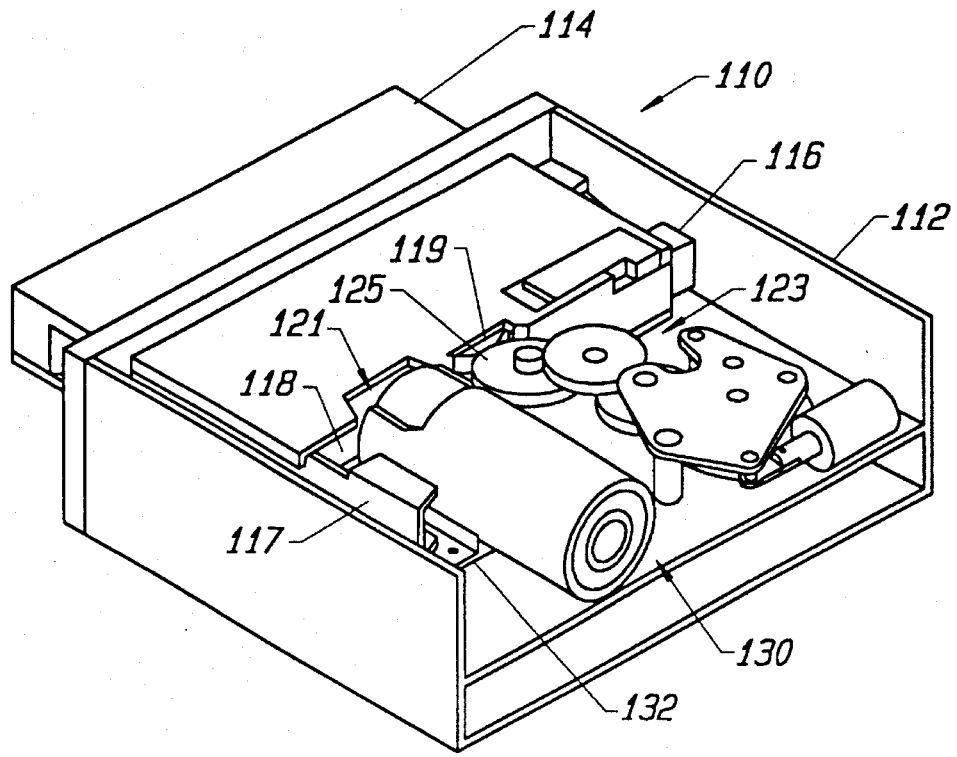
FIGS. 2A and 2B are three-dimensional and cross-sectional representations of an arcuate scan tape head assembly.
Figure 2B:
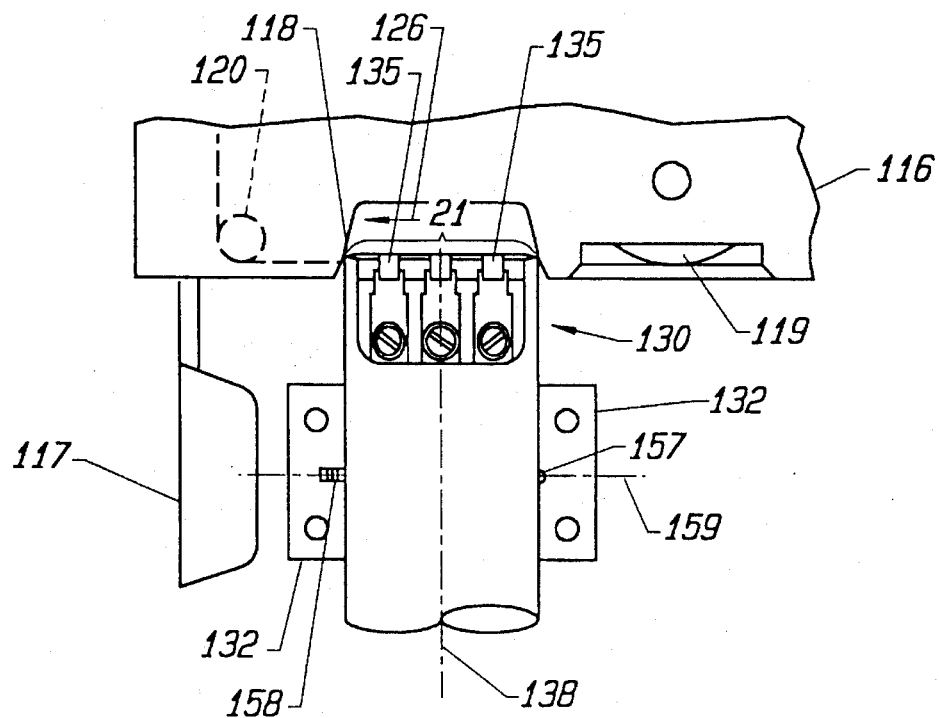
Figure 3A:
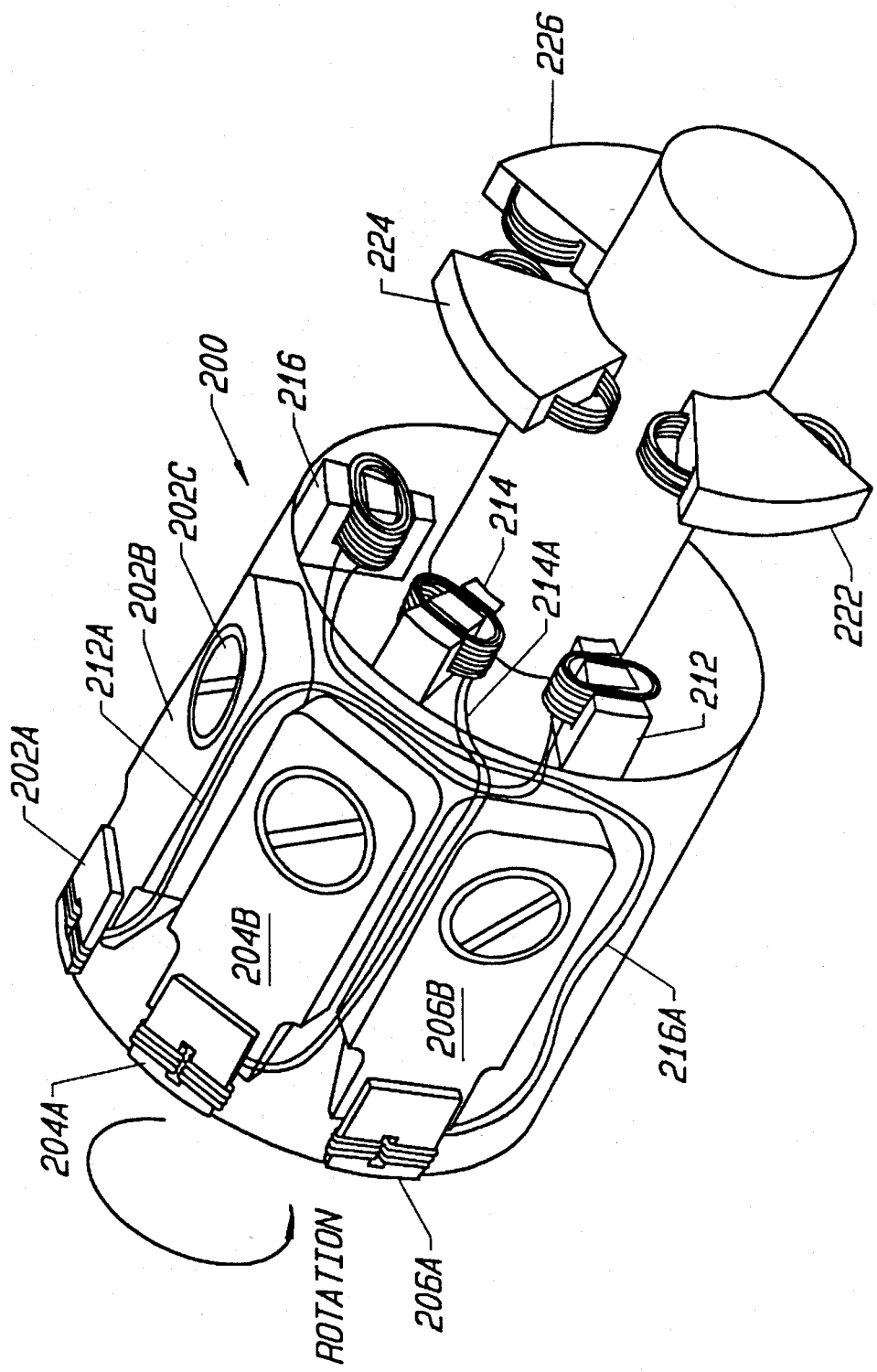
FIG. 3A is a perspective, cutaway view of an arcuate scan tape head assembly showing a rotary transformer scheme for use therewith.
Figure 3B:
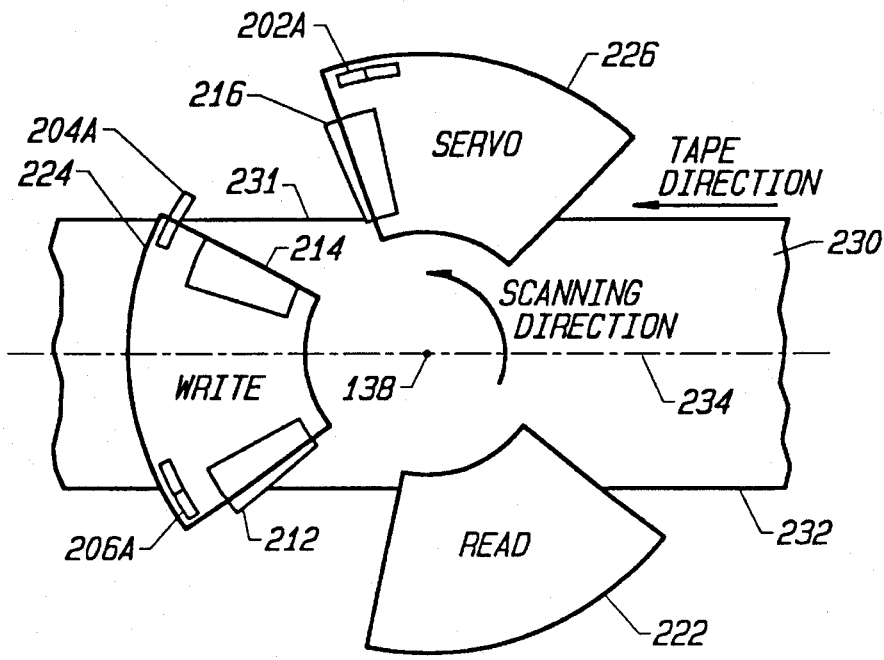
FIGS. 3B and 3C are schematic drawings representing geometrical relationships of various components of the rotary head assembly.
Figure 3C:
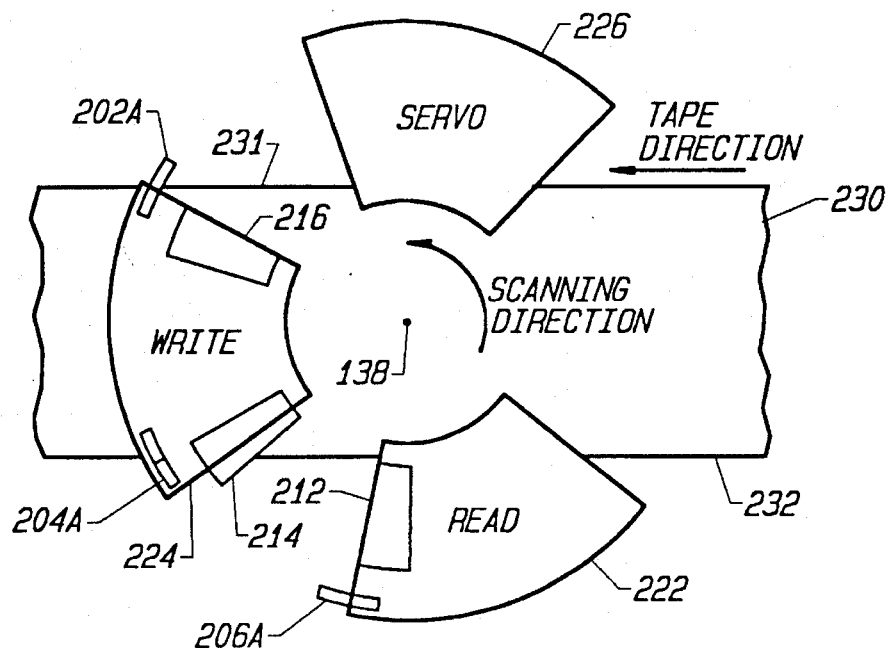

In accordance with the present invention, a novel rotary transformer assembly is provided. The rotary transformer design of the present invention provides increased isolation and uniform operating characteristics for each channel in the multi-channel transformer making the transformer of the present invention useful in a number of various applications.

A first embodiment of the rotary transformer 300 of the present invention is shown in FIGS. 4A and 4B. FIG. 4A is a side view, and FIG. 4B a cross-sectional view, of a rotor 310 and stator 320 comprising transformer 300. Rotor 310 is mounted on a rotating shaft 280 which may comprise part of a video tape head assembly or a rotating arcuate scan tape head assembly. Stator 310 includes a plurality of sector-shaped blades 311–318 generally comprised of a ferrite material. Each blade 311–318 may be manufactured by machining grooves 319 in a solid disk of ferrite material. Each blade 311–319 has approximately 45° arc length relative to rotational axis 338. Transformer 300 is designed to have eight (8) separate channels. The eight channels correspond to the eight blades 311–318 shown in FIG. 4A.

In one embodiment, four channels are dedicated read channels and four channels are dedicated write channels. In such an embodiment, alternating channels are dedicated to the read and write functions: blades 312, 314, 316, and 318 are dedicated as read channel blades, while the remaining, interposing four blades 311, 313, 315, and 317 are dedicated to write channels. Each blade 311–318 contains a winding 321–328, respectively, which interacts with a corresponding winding on stator 320. Windings 322, 324, 326 and 328 are provided at a first radial distance R1 from rotational axis 338 of rotor 310. Windings 321, 323, 325, and 327 are provided at a second radial distance R2 from rotational axis 338.

In accordance with the present invention, stator 320 is mounted in a fixed position, and is comprised of plates 331 and 332 forming a u-shaped cross-section as shown in FIG. 4B. Plates 331 and 332 respectively surround the blades of stator 310 as each blade rotates between the plates. Each plate 331, 332 has a first side 320a and a second side 320b which are defined by an arc length of 90° with respect to rotational axis 338 of stator 310. Thus, at any time a maximum of two blades (blades 314 and 315 shown in FIG. 4A) pass between plates 331 and 332. Stator 320 includes two sets of windings 333, 336 and 334, 335 which provide inductive commutation with windings 321–328. Windings 334 and 335 are provided at a radial distance R1 from rotational axis 338 and thus commutate directly with windings 322, 324, 326 and 328 when such windings pass between plates 331 and 332. Likewise, windings 333 and 336 are provided at a radial distance R2 from axis 338 and commutate with windings 321, 323, 325, and 327 when such windings pass between plates 331 and 332 of stator 320.

The provision of both rotor and stator windings at two different radial distances from the rotational axis significantly improves the isolation of each channel. Isolation of each particular channel is further increased by air gap 319 separating the respective blades. Magnetic flux in the active channel must traverse the air gap to inductively couple to adjacent channels to create cross-talk. Isolation for each of the blades is also significantly improved by the alternating location of the windings on neighboring blades. By placing coils on stator 310 at different radial distances from rotational axis 338, the increased flux path—in both the air gap distance between the windings and the amount of ferrite between the windings—reduces the possibility for stray inductance and magnetic field coupling between adjacent windings. For example, if stator windings 336 and 333 are energized to provide a write signal to a rotor winding, for example, winding 325 when winding 325 is passing between plates 331 and 332, inductive coupling will generally only occur across air gaps G1 and G2 between the respective windings. In a rotary transformer having a rotor diameter of 0.6 inch, the width of gaps G1 and G2 is approximately 0.0005". While a flux path remains in the ferrite material in adjacent blades 314 and 316, and the possibility of cross-talk is not completely eliminated, because windings 326 and 324, being adjacent to winding 325, are separated by both gap 319 and their different radial distance from winding 325, the flux path is effectively lengthened, thereby substantially increasing isolation. Hence, inductive coupling will primarily occur between windings 333 and 336, and winding 325 in the instant example. The same is true for the read windings at radial distance $R_1$ shown in FIGS. 4A and 4B, though, in general, the read signals are smaller, if not substantially smaller, than those passing through the write channel windings.

Figure 4C:
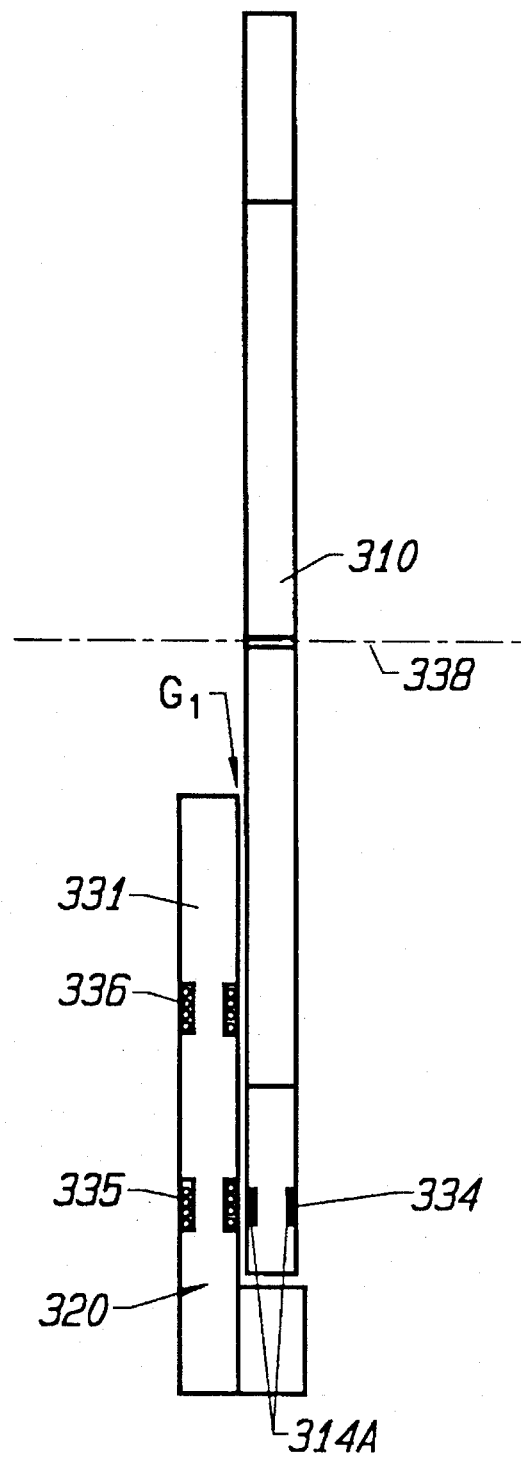
FIG. 4C is a cross-sectional view of the first of a rotary transformer in accordance with the present invention utilizing a single stator element.

It should be noted that while two blades 331,332 are shown in FIG. 4B, only one such plate is necessary for satisfactory operation of the transformer of the present invention. Such embodiment is shown in FIG. 4C.

Still further, a uniform performance for each read channel and each write channel in the system is achieved since the radial position of each of the windings is the same for each dedicated read channel or write channel. In contrast to the conventional transformer discussed in the Background section of the application, where each channel winding had a different diameter, area, and performance, the area and performance of each read channel and each write channel is uniform. As a result, the transformer of the present invention is particularly suited to data storage applications.

Figure 5:
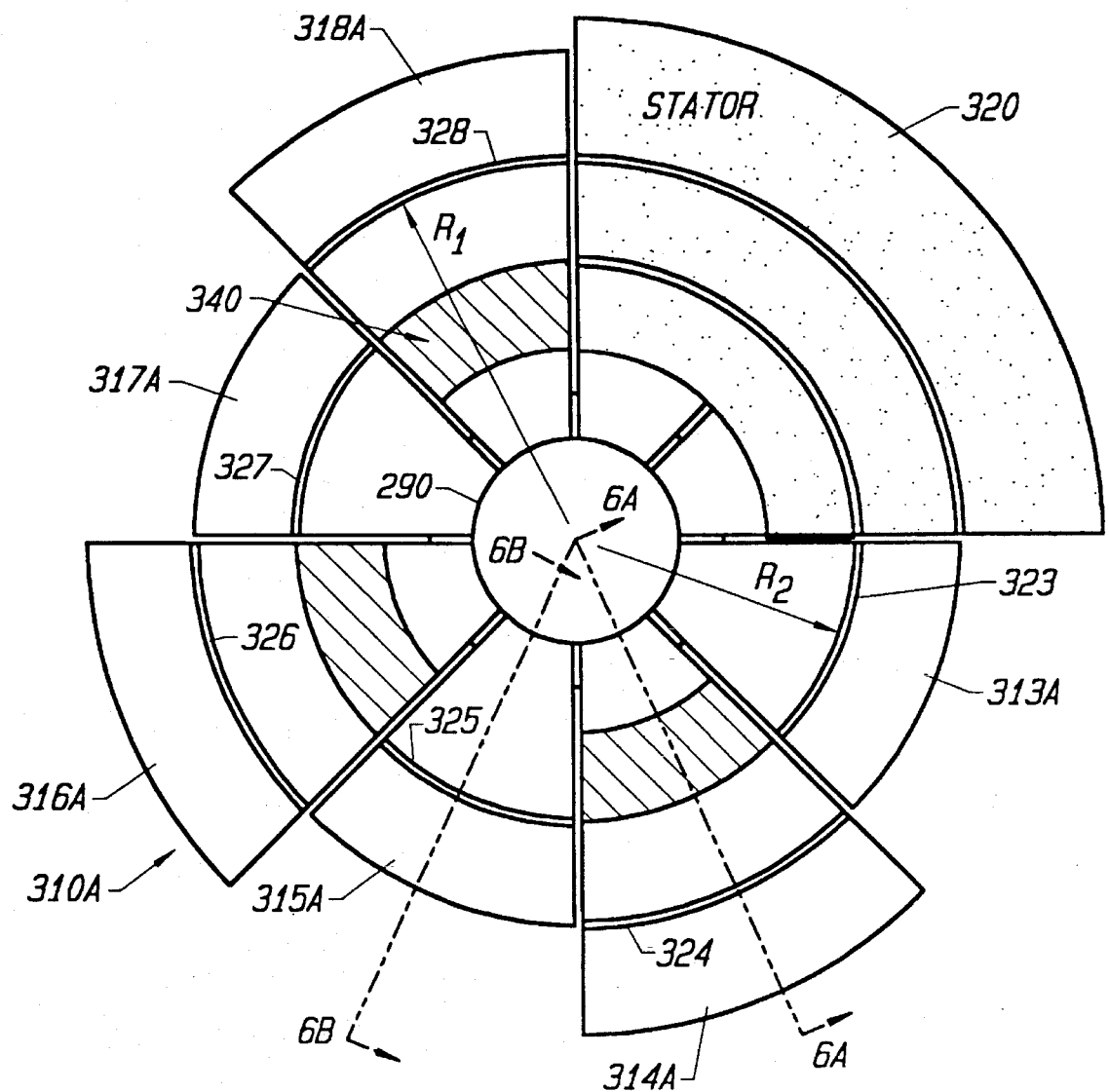
FIG. 5 is a side view of a second embodiment of a rotary transformer rotor and stator in accordance with the present invention.
Figure 6A:
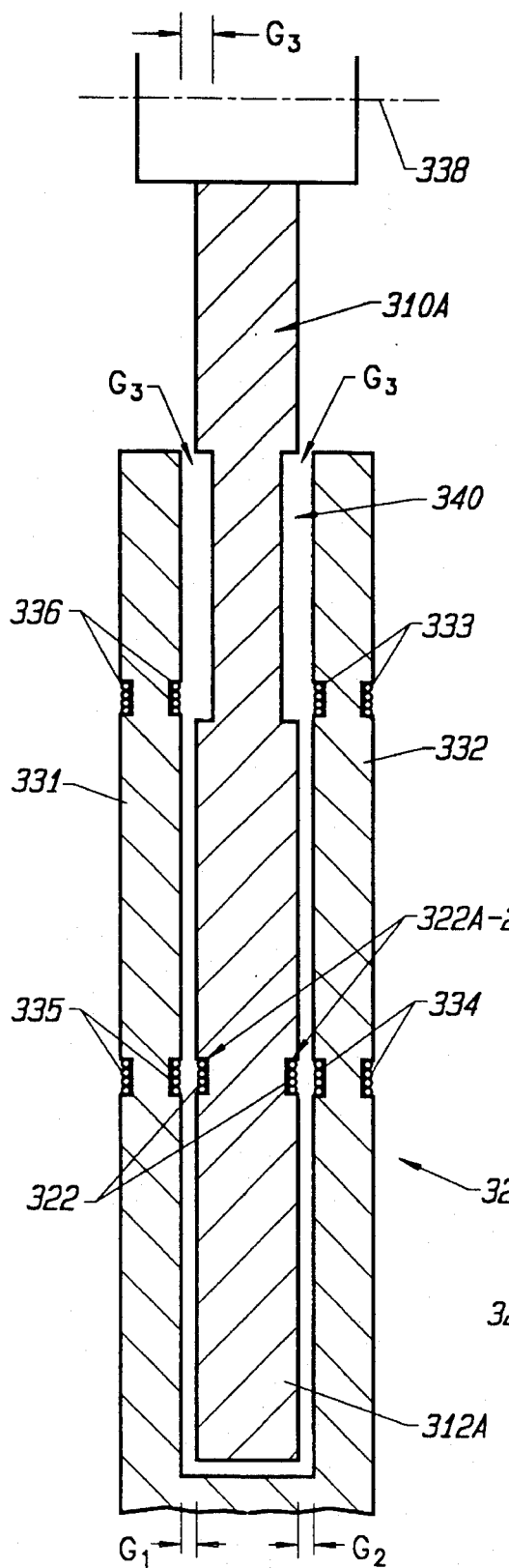
FIGS. 6A and 6B are cross-sectional views of the second embodiment of the rotary transformer along lines A—A and B—B in FIG. 5.
Figure 6B:
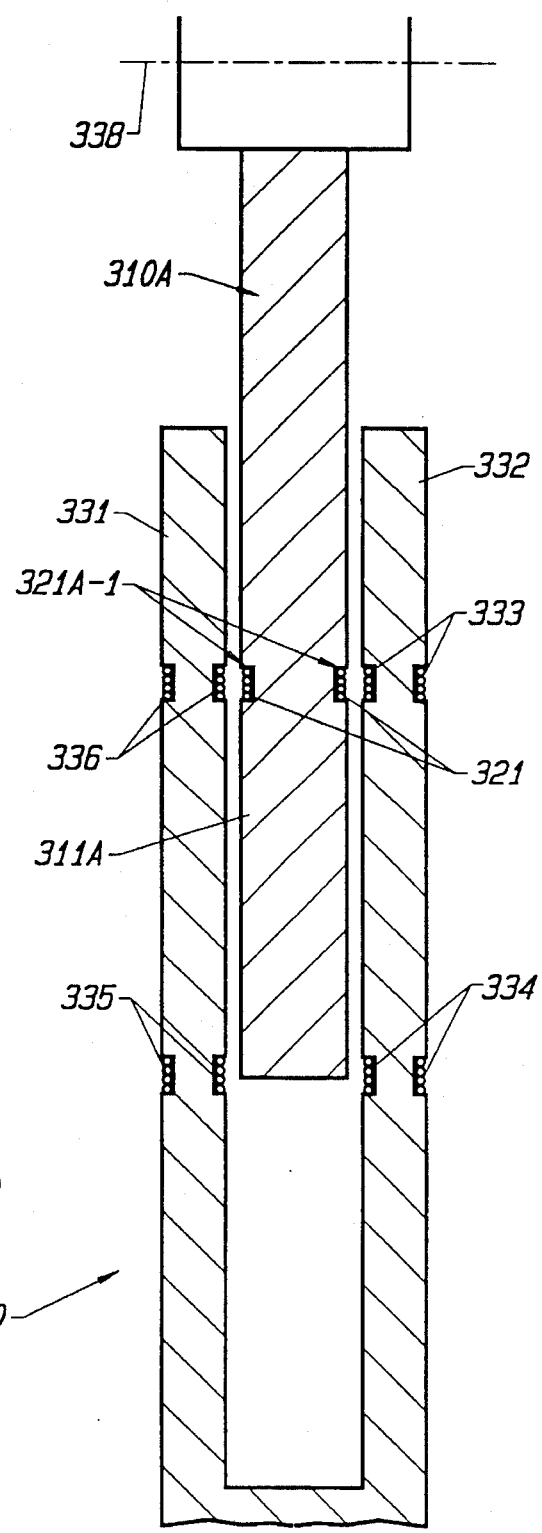

FIGS. 5, 6A and 6B show a second embodiment of the rotating transformer of the present invention which provides even greater channel isolation. Improved channel isolation in the embodiment shown in FIGS. 5, 6A and 6B is achieved by eliminating the potential for stray flux coupling by increasing the air gap at key points between the rotor and stator. FIG. 5 is a side view of the stator and rotor assemblies, and FIGS. 6A and 6B are cross-sectional views along lines A—A and B—B of the rotor assembly shown in FIG. 5. The second embodiment of the rotary transformer is similar to the design shown in FIGS. 4A and 4B, thus like reference numerals represent like parts. The stator assembly 320 is essentially identical to stator 320 shown in FIGS. 4A and 4B, and has a u-shaped cross-section (not shown) such that the blades of rotor 310a pass therethrough. (Again, it should be understood that two plates 331 and 332 are not required, and the embodiment of the transformer of the present invention disclosed in FIGS. 5, 6A and 6B would work suitably well with a single plate stator.)

Rotor assembly 310a has two significant design changes with respect to assembly 310 shown in FIGS. 4A and 4B. Namely, exterior regions of blades 311a, 313a, 315a, and 317a have been removed to further increase the flux coupling path between read windings 322, 324, 326, and 328. In addition, a 3 mil undercut region 340 has been provided from each side of blades 312a, 314a, 316a, and 318a. In essence both such modifications increase the isolation of the channel by increasing the air gap between sectors/channels with active flux and adjacent sectors/channels. As shown in FIG. 4B, gaps G1, G2 between plates 331, 332 and rotor 310 are equal at a distance of about 0.0005". The undercut sections 340 increase air gap $G_3$ in this region to a distance of about 0.0065". In addition, as shown in FIG. 6B, when a write channel blade (311a, 313a, 315a, 317a) is passing through stator 320, the write channel blade (311a in FIG. 6A) is clear of stator coils 334, 335, (designated to interact with the read channel rotor coils), and hence the gap between the write channel cores and the read channels is essentially infinite. The rotary transformer shown in FIGS. 5, 6A and 6B, is suitable for use with applications which may require different coupling energies at different channels. For example, when this embodiment is used in an arcuate scan tape head assembly, the read channels of the drive constitute a major limiting factor in transformer design since there is a minimum level of efficiency necessary to produce inductive coupling of the recorded signal. Thus, the read channels are dedicated to the windings at radial distance R1, yielding windings with a greater area and hence greater inductance for the limited read signals from the tape source. The write channels are dedicated to the windings at radial distance R2, since the sensitivity of the write signal to the amount of coil area necessary for coupling is less critical, and the amplitude of the write signal can be increased by the pre-amplifier circuit to compensate for limitations in the transformer coupling.

In the aforementioned use of the rotary transformer in an arcuate scan tape drive, providing undercut regions 340 is sufficient to preclude cross-talk between the read signal on winding 332, 333, 334, and is especially important in reducing inductive coupling when providing the higher-voltage write signal to windings 321, 323, 325 and 327. Because the signal applied to the stator directed to windings 333, 336 is large in comparison to the read signal area, a greater chance for cross-talk from the write channel to the read channel exists than for coupling from the read channel to the write channel. Hence, the provision of the nearly infinite gap, by shortening the sectors carrying write channel windings, greatly reduces the possibility of such coupling.

It should be understood that while eight individual channels are shown, the invention is not as limited and can be equally applicable with greater or fewer channels. Indeed, the relationship of the radial distance of the coils from the rotational axis, and the number of segments with corresponding numbers of coils, teaches the relation that any number of channels might be supported by the general design teachings of the present invention. At minimum, two channels could be utilized. An increase in the area of the coil, corresponding to the area of the arcuate segment on which the coil is wound, is directly related to the inductive sensitivity of the channel for which the coil is used. It should be further understood that channels can be further defined by providing windings at more than two radial distances from the rotational axis of the transformer, with a corresponding number of windings on the stator. In addition, based on the particular use of the transformer, the arc length of the segments may be varied and/or need not be symmetrical.

Figure 7A:
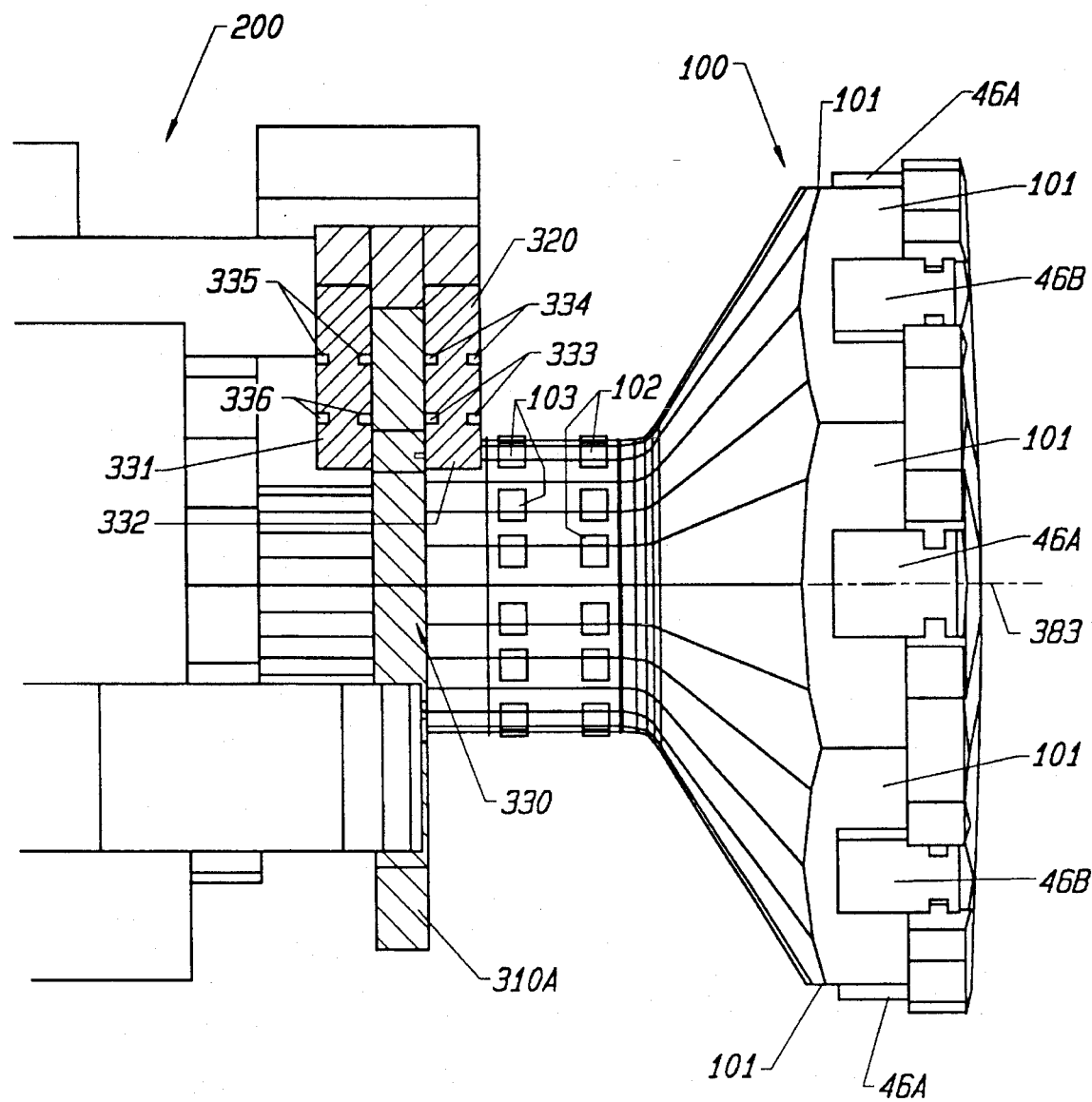
FIG. 7A is a side view of the rotary transformer and stator assembly shown in FIGS. 5, 6A and 6B used in conjunction with a rotary head assembly for an arcuate scan tape drive.

FIG. 7A is a side view of an arcuate scan head assembly used in conjunction with the embodiment of the rotating transformer shown in FIGS. 5, 6A and 6B. In general, a head carrier assembly 200 suitable for use with an arcuate scan head assembly includes a head carrier drum 100 at the forward section of the head assembly. Other elements of the assembly may include a support yoke 138 at a midsection of the assembly, a spin motor 140 and a pivot motor 142 structure at a rear section of the assembly. Rotational axis 338 is defined by the rotational center of the head carrier drum 100.

A plurality of magnetically permeable core elements 46 are provided around an outer radius of the drum 100. During operation of the tape drive, head carrier drum 100 rotates, for example, counterclockwise, as the tape advances, for example, in a direction into the surface of the page so that core elements 46 on the half of the face plate parallel to the data tape will trace out a plurality of arcuately shaped data tracks in a recording area on the tape.

Figure 7B:
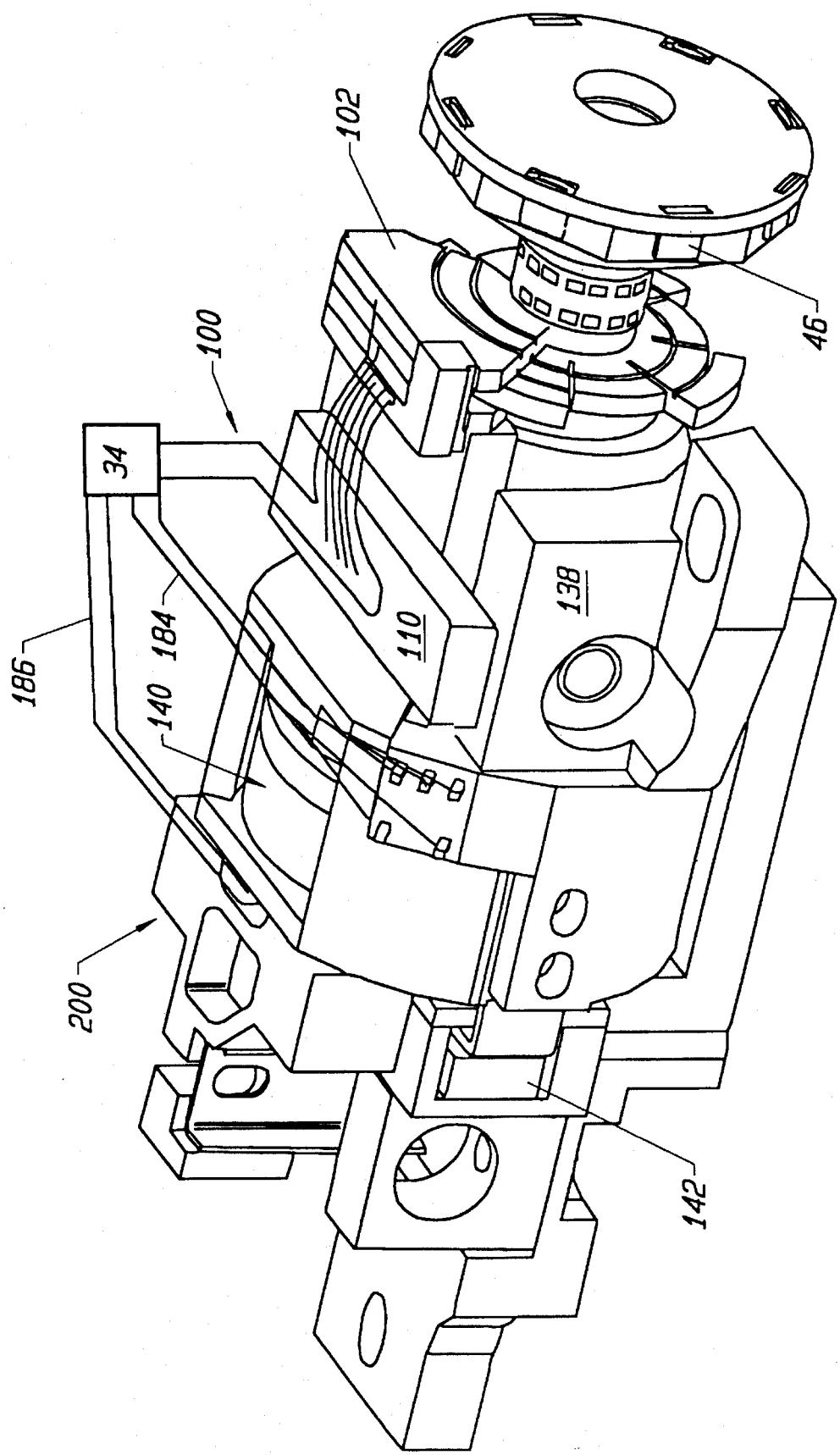
FIG. 7B is a perspective view of a rotary head assembly for use in an arcuate scan disk drive.

In the embodiment shown in FIGS. 7A and 7B, head drum 100 has an octagonal shape and includes four read core elements 46a and four write core elements 46b mounted to the eight flat edge surfaces 101. The core elements are alternately provided around head drum 100 so that a read element 46a always neighbors a write element 46b and visa versa. The tape drive of the present invention may alternatively include only four core elements 46, with two read elements 46a and two read elements 46b. In this embodiment the elements are again alternately provided on the flat edge surfaces 101 of octagonal head drum 100 with alternate edge surfaces left empty. It is additionally understood that head mounting drum 100 may be formed with more or less than eight surfaces and various numbers of core elements 46.

The face of the drum may be comprised of a conical face plate or a flat face plate in accordance with the teachings of U.S. patent application Ser. No. 08/113,996, entitled ARCUATE SCAN TAPE DRIVE, filed Aug. 30, 1993, inventors John M. Rottenburg, Joseph Lin, Robert E. Peirce, Richard Milo, and Michael Andrews, owned by the assignee of the present application and hereby specifically incorporated by reference.

Each core element 46 is coupled to a solder pad 102 by electrical leads (not shown). Each solder pad 102 has a corresponding paired solder pad 103 to which the particular winding associated with the particular head is coupled, also by electrical leads (not shown).

Figure 7C:
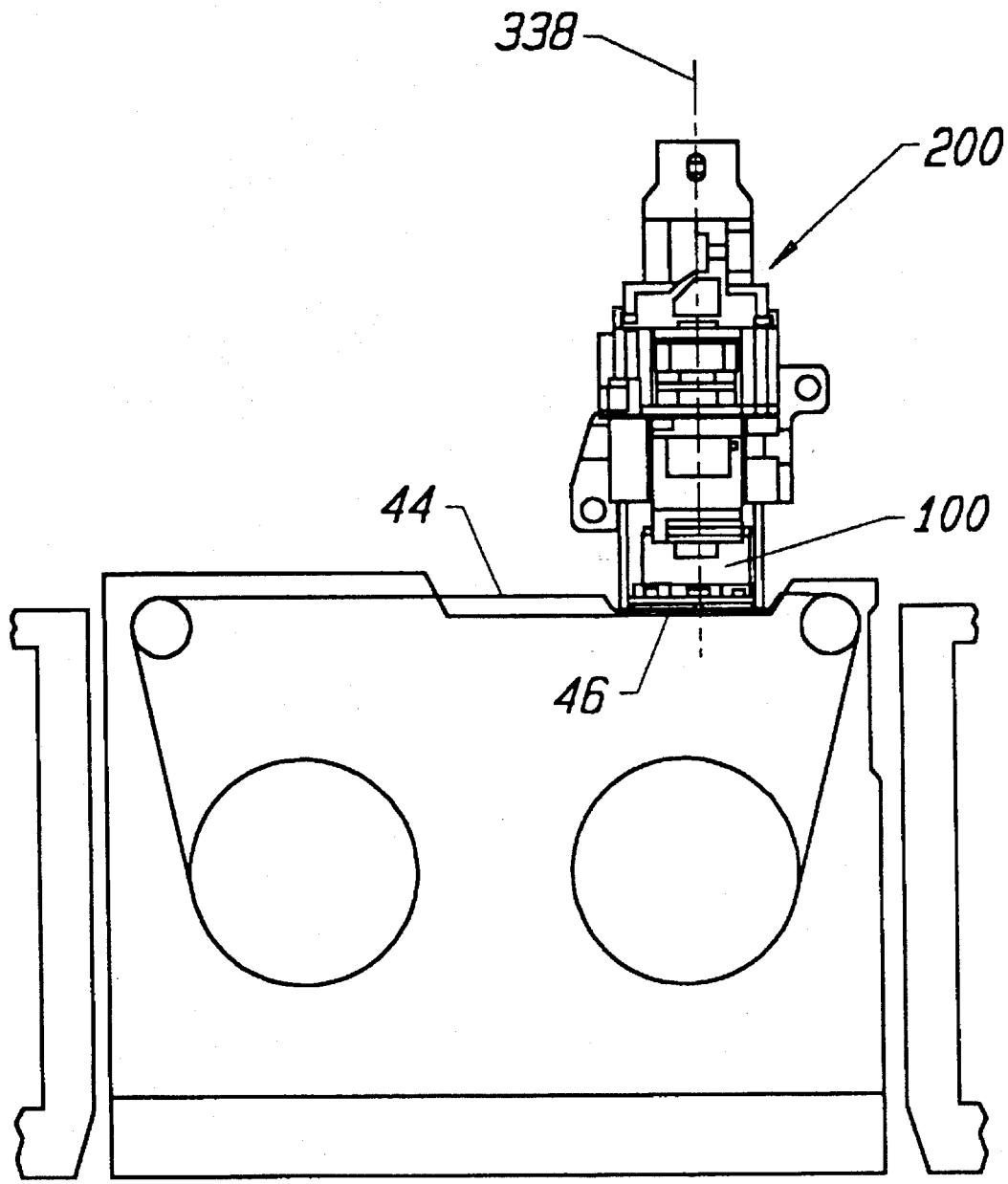
FIG. 7C is a plan view of the rotary head assembly shown in FIG. 7B.

As shown in FIGS. 7B and 7C, the head carrier drum 100 may be comprised of a substantially cylindrical body with a flat circular face plate 179 at its front face. In this embodiment, the rotational axis 383 of head carrier assembly 132 lies perpendicular to the surface of data tape 44 and the entire front circular face lies substantially parallel to the adjacent section of data tape 44 in recording area 45.

When used in conjunction with the head drum 100, rotary transformer 300 provides optimal signal transfer to and from a data storage tape through the uniform channel performance and improved channel isolation characteristics for each read/write transducer channel on the arcuate scan recording head assembly. As noted above, because the read coils are all provided at a particular radial distance R1 from the rotating axis, and the write coils are also all provided at a second radial distance R2 from the rotating axis 338, the commutative performance of each of the channels is nearly identical. Hence, there is no need to optimize the pre-amplifier electronics for each particular different read or write channel in use at the particular time as would be the case with the conventional rotary transformer. Cross-talk is reduced by the superior isolation characteristics of the transformer.

Yet another embodiment of the rotary transformer of the present invention is shown in FIGS. 8A and 8B. Again, like reference numerals represent like parts to those shown in the previous embodiments. In the embodiment shown in FIGS. 8A and 8B, two rotor wheels are utilized in conjunction with two separate stator pieces 320-1 and 320-2. In the embodiment shown in FIG. 8, a first rotor wheel 310*a* includes windings only on blades 312-1, 314-1, 316-1 and 318-1. Likewise, on rotor wheel 310*b*, windings are provided on blades 311-2, 313-2, 315-2 and 317-2 (not shown). Note that in this particular embodiment the windings are all positioned at radial distance $R_1$ from the rotational axis 338. In the embodiment shown therein, one stator is utilized as a stator for the read channel, another stator is utilized for stator for the write channel. In an alternative embodiment, not shown in FIG. 8, alternating blades (in FIG. 8 blades 311-1, 313-1, 315-1, and 317-1) would be removed, leaving only four blades per rotor, so as to provide even greater isolation between the particular blades carrying windings on each rotor. Alternatively, using the rotor wheels shown in FIGS. 5, 6A and 6B, 16 channels can be manufactured out of the particular rotor and stator assemblies with eight windings per rotor, four each at alternating radial distances from rotational axis 338. An alternative means for manufacturing additional channels would be to reduce the sector angles from 45° to a smaller angle length. It should be understood that numerous variations on the design of the rotary transformer of the present invention are well within contemplation of one of average skill in the art.

Figure 9:
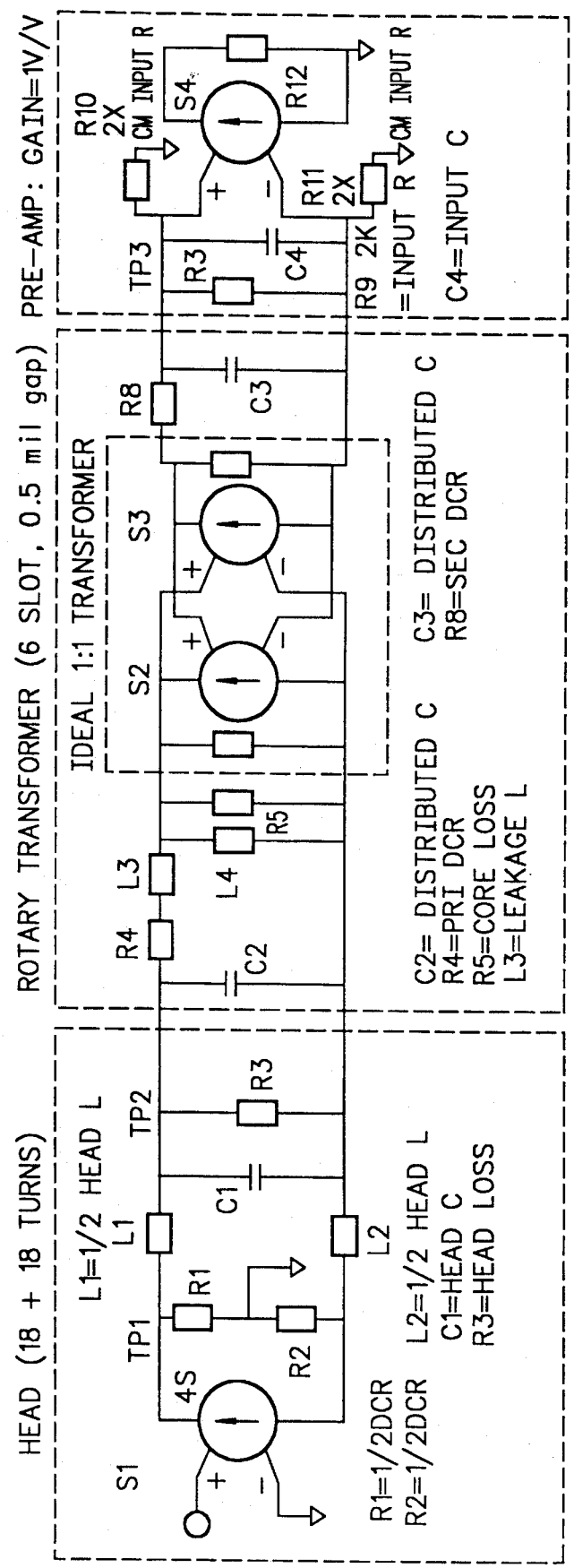
FIG. 9 is a block representation of the read model of a rotary transformer utilized in conjunction with testing and evaluating the rotary transformer of the present invention.
Figure 10:
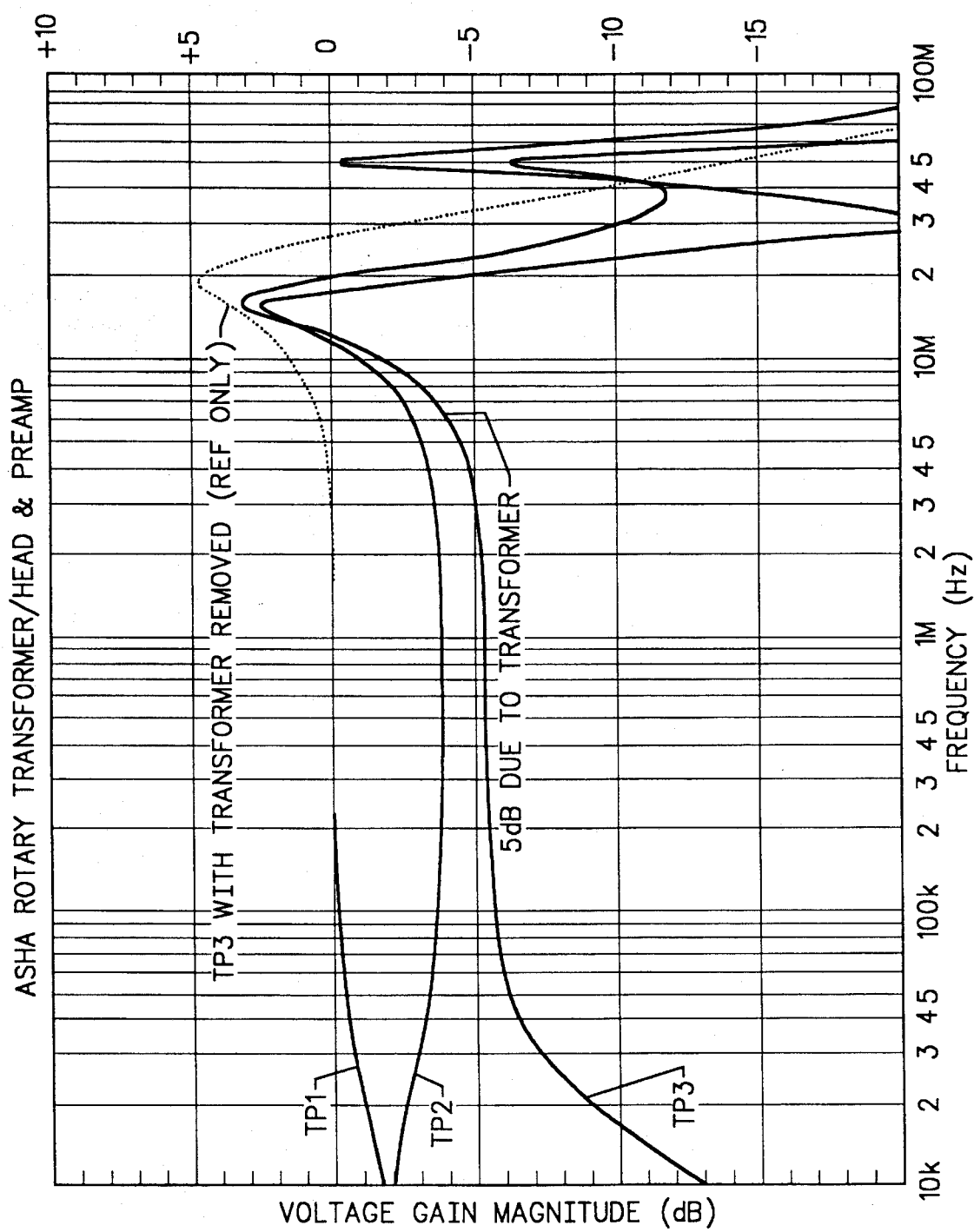
FIG. 10 is a graph representing simulated values for three points of the circuit shown in the read model FIG. 9 using a conventional rotary transformer.
Figure 11:
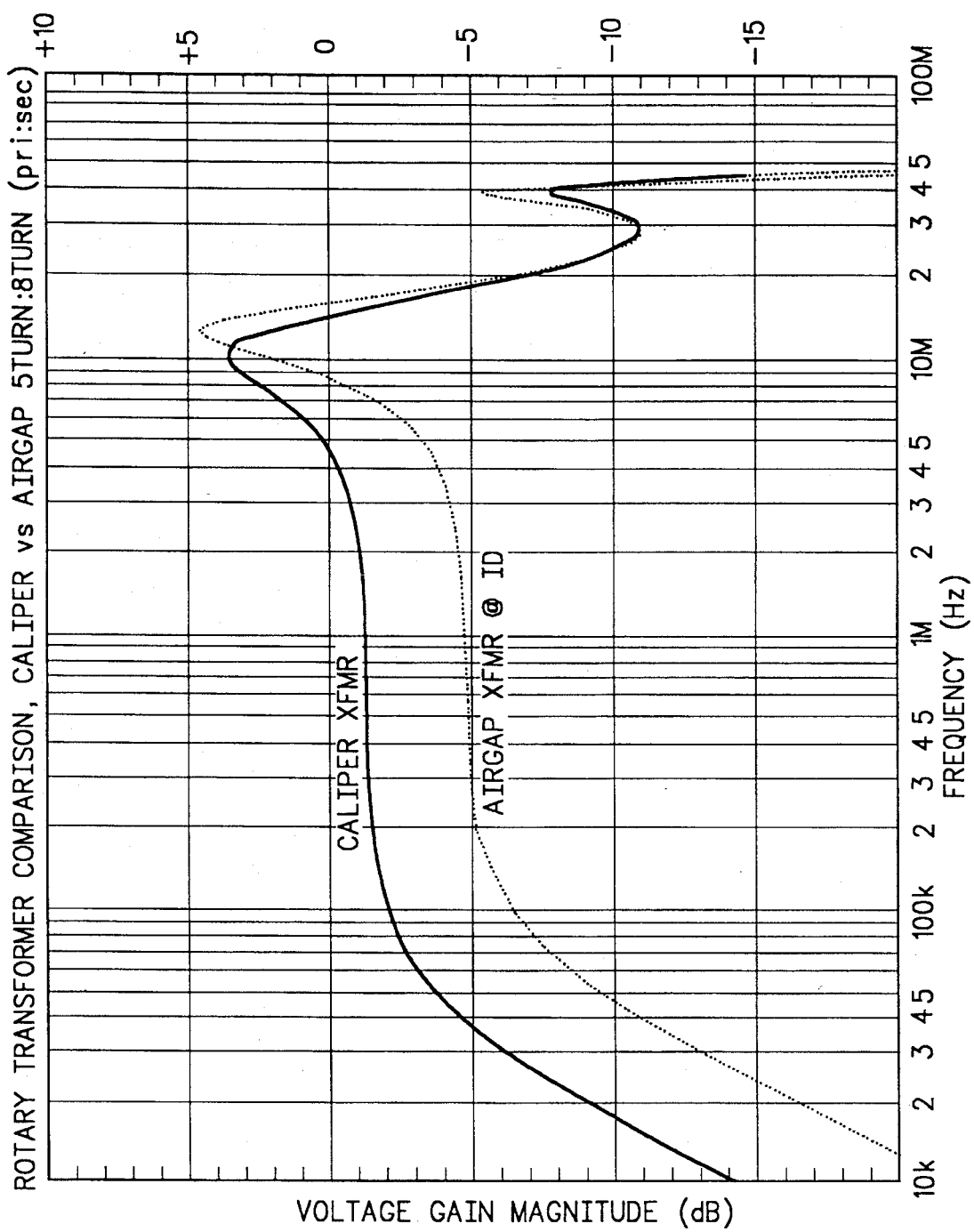
FIG. 11 is a graph representing simulated values for the performance of the rotary transformer shown in FIGS. 5, 6A and 6B in the read model.

FIGS. 10–11 represent performance graphs of various rotary transformer designs discussed herein. A computer aided design model was utilized to evaluate the performance of the rotary transformer. FIG. 9 represents an idealized model of the electrical circuit utilized to derive the performance of the rotary transformer of the prior art. A head is coupled to the secondary windings of the transformer, while the transformers primary windings are coupled to a preamplifier. A preamplifier suitable for use with a rotary transformer in an arcuate scan drive assembly is the SSI model 32R2021R, available from SSI Corporation.

The specific elements incorporated into the evaluation circuit would be readily apparent to one of average skill in the art. For example, a standard performance model of a head suitable for evaluation consistent with the analysis discussed hereafter would take into account the inductance (L1,L2), resistance R1, R2, R3) and capacitance (C1) of the head. The same is true for the transformer where the model would take into account both the primary (L4) and leakage (L3) inductance of the transformer, in addition to the resistance (R4, R8) and the distributed capacitances (C2, C3) of the transformer primary and secondary coils. Finally, the model includes the differential input resistance (R9) for the preamplifier section, and further account for the input resistance (R10, R11) and capacitance (C4) of the preamplifier section.

The evaluation assumed the performance of the transfer was to be optimized for an arcuate scan tape drive assembly. As noted above, in such application, the performance of the transformer is primarily designed to optimize channel performance during read data from the tape. The voltage levels used during the read/write process are on the order of 150 μv with the maximum diameter of the transformer at 0.6 inch. The read channel performance is of greater criticality since the write channel voltage transfer can, to a greater extent, be enhanced by modifying the signal output of the preamplifier circuit.

A graph representing the swept frequency analysis at each of three test points TP1, TP2, TP3 is projected for the rotary transformer discussed in the Inoue, et al. article is shown in FIG. 10. The four plots represent the following: TP1 is a representation of the output of the preamplifier section and would reflect what the output at the preamplifier is in a perfect system with no loss or distortion; TP2 shows the total loading effect of the transformer primary and reflected secondary impedance on the head output; $TP3_1$ is a representation of the head and preamplifier performance together without a rotary transformer; and $TP3_2$ is a representation of the head and preamplifier performance with the effect of the conventional rotary transformer.

The ideal representation of the preamplifier output (TP1) acts as the reference point and reflects some low frequency loss as a result of the primary inductive loading. Above 100 kz, the curve is virtually flat at 0 dB. As such, TP1 acts as a reference point and reflects what output of the preamplifier should in a perfect system with no loss or distortion. TP2 shows the total leading effect of the transformer primary and effected secondary impedance on the head output; the net result (TP2) is a 3.5 dB read signal loss. In an arcuate scan tape drive, this figure would be excessive. The next reference point is $TP3_1$, which reflects a direct coupling of the preamplifier to the head. Although such coupling would not be a practical solution, this reference illustrates how the preamplifier and head will perform together without a rotary transformer. In this case, the voltage gain losses are negligible, with a peaking in the response only occurring at the 20 MHz due to the combined effect of the head self resonance and the preamplifier input capacitance.

Finally, the effect of the conventional rotary transformer is shown at TP3$_2$. This graph reflects a 5 dB signal loss relative to the ideal system (TP3$_1$), amounting to a sacrifice of about 44% of the read signal in the transformer.

It is generally accepted that the optimum source loading (noise figure) occurs when the voltage produced at the source as a result of the input current noise times the source impedance is equal to the preamplifier input noise voltage. However, the absolute level of signal relative to the electronic noise floor may dictate a lower impedance operating point. In other words, the turns ratio must be optimized for a balance of noise figure and signal level.

Using the above model, additional simulations were performed in which the turns ratios of the conventional transformer were altered. With a higher turns ratio, the signal amplitude was recovered, but the resonant frequency dropped sharply when turns were added to the secondary, causing the primary inductance to increase. In addition, the leakage inductance also increased, adding impedance noise to the channel and reducing the efficiency of the channel.

FIG. 11 represents a graphical depiction of the performance of the rotary transformer shown in FIG. 5 versus a modified conventional transformer. In the modified conventional transformer, an air gap was provided between each winding by laser machining of the core material between each winding. While this high reluctance path dramatically reduced the channel-to-channel crosstalk previously seen in the core, and substantially improved the low channel-to-channel coupling below 15 MHZ, laser machining the core to provide the air gap isolation resulted in a loss of effective core cross sectional area and a subsequent reduction in primary inductance. In yet another modification, additional turns were added to the secondary to compensate for the additional insertion loss caused by low impedance. In this version the same output level was achieved without crosstalk, however this transformer still suffered from variations in channel-to-channel performance.

As shown in FIG. 11, the transformer of the present invention (in the embodiment shown in FIGS. 5, 6A and 6B), achieves a 4 dB signal increase over the modified (air gap) transformer with the same number of turns and turns ratio as the modified transformer. Channel isolation is in excess of 40 dB.

Figure 12:
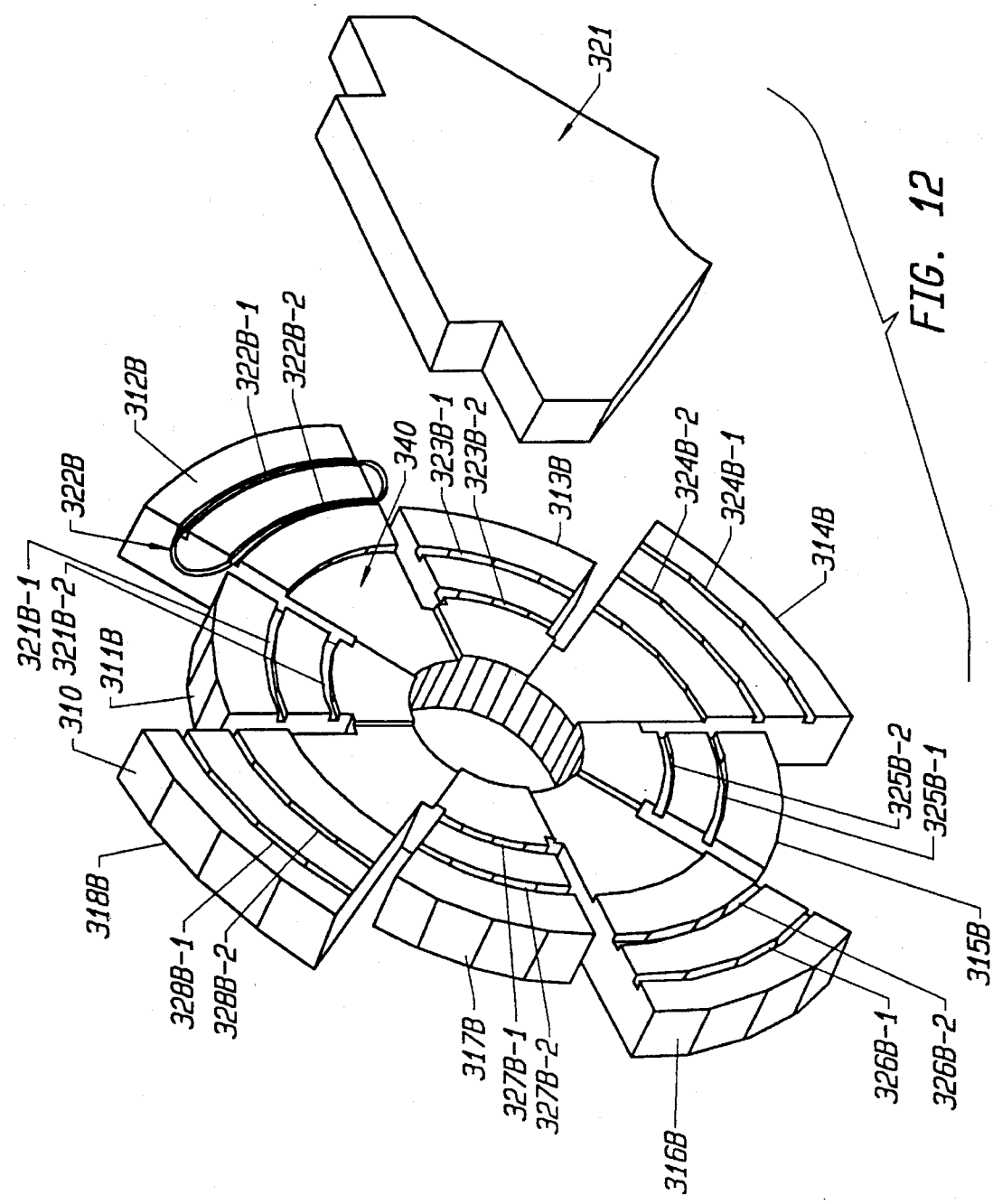
FIG. 12 is a perspective view of a third embodiment of the transformer of the present invention.

Yet another embodiment of the present invention is shown in FIGS. 12–13. FIG. 12 is a perspective view of rotor 310$b$ and stator plate 321$b$. As shown therein, winding 333$a$ is wound in a bobbin-type fashion and comprises a single coil resting in both grooves 322$b$-1 and 322$b$-2. This type of winding may also be referred to as "planar wound".

Rotor 310$b$ is similar in construction to rotor 310$a$, but includes a pair of grooves 321$b$-1, 321$b$-2 through 328$b$-1, 328$b$-2 per blade. As will be noted, the construction of rotor 310$b$ is such that the radius R$_5$ (FIG. 13A) of the write coil blades 311$b$, 313$b$, 315$b$, and 317$b$ is less than the radius (R$_3$) of the innermost groove on the read channel blades 312$b$, 314$b$, 316$b$, and 318$b$. Stator 321$b$ is of similar construction and includes two bobbin-like coils 334$b$ and 333$b$ (shown partially in FIG. 13A). While only one coil 322$b$ is shown in FIG. 12, it should be understood that a similar coil is present in each of groove pairs 321$b$-1, 321$b$-2 through 328$b$-1, 328$b$-2.

Figure 13A:
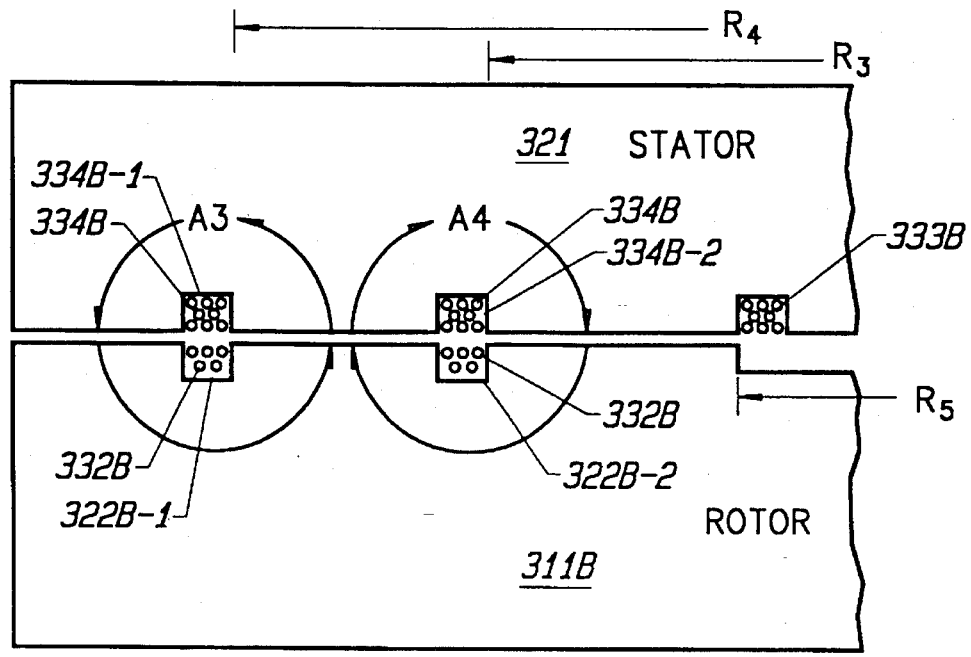
FIG. 13A is a cross-sectional view of the third embodiment of the transformer embodiment shown in FIG. 12.

The embodiment of the invention shown in FIGS. 12 and 13A allows for each coil to be wound on a bobbin-like fitting (not shown) and thereafter inserted onto the respective blades. In addition, the amount of coil area available for inductive coupling is greater than in the embodiments discussed above with respect to FIGS. 4, 5, and 6.

Figure 13B:
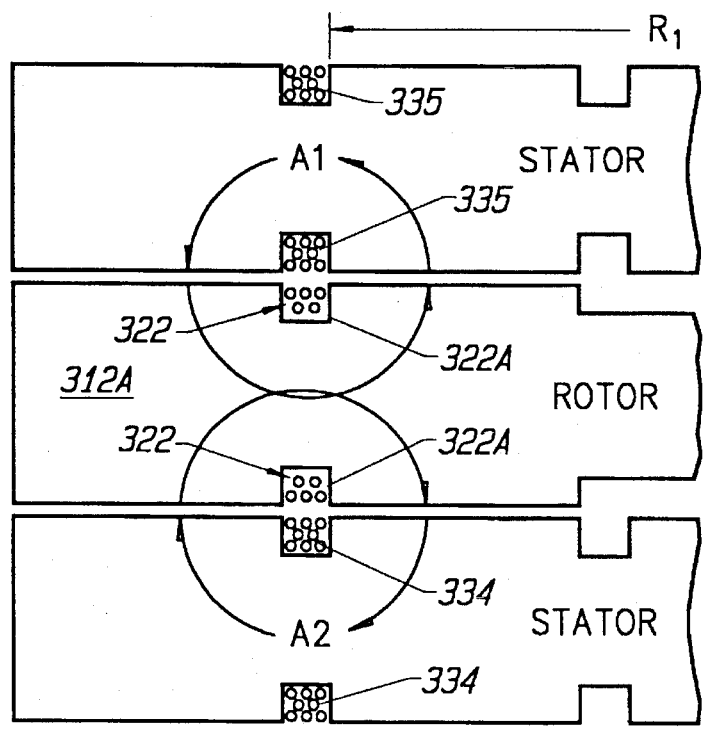
FIG. 13B is a cross-sectional view of a transformer of the second embodiment similar to that shown in FIGS. 5 and 6.

FIG. 13A is a cross sectional representation of a stator and rotor of the transformer embodiment discussed with respect to FIG. 12, while FIG. 13B is a cross section of the rotor and stator assembly shown in FIG. 6A. In the embodiment of FIGS. 5 and 13B, the coils are wound around the blade with the coil running from one side of the blade to the other—thus some wire is not utilized for inductive coupling since it is generally found in slots 319 between the first and second sides of the blades. In the embodiment of FIG. 13A, all of the coil is available for inductive coupling. However, there are certain trade-offs in choosing one design over another.

For example, to achieve equivalent coupling area for the coils, the embodiment of FIG. 12 must have a slightly larger diameter. In one embodiment, where R$_1$ is about 0.238 inch, R$_3$ is 0.258 inch, and R$_4$ is 0.307 inch, the area of coils 332$b$, 334$b$ (A3+A4) available for inductive coupling is 1.1 times greater than the area (A1+A2) of coils 335,322, and 334 in the embodiment shown in FIG. 13B. However, it should also be noted that the radial distance of R$_1$ of the outermost coils in the embodiment discussed above is less than the radial distance R3 of the innermost read channel coil gap (322$b$-2). Thus, the planar-type winding method of the embodiment of FIG. 12 requires increasing of the size of the rotor to achieve and equivalent coupling area of the coils.

As should be generally understood, the placement of the coil gap areas is integral to the amount of area available for coupling since the amount of coil on the surface of the blades (and in the gap) increases as the radial distance increases. However, the total distance of the arcuate scan head assembly will be shorter since only one stator element is required to yield the same inductive coupling area.

It should be further understood that the embodiment of the invention shown in FIG. 12 could be implemented using the winding scheme discussed above with respect to the embodiment of FIGS. 5 and 6. Alternatively, while only one stator is shown in FIG. 12, two stators could be utilized, with the addition of coils on both sides of the rotor, effectively doubling the number of channels available on the transformer.

An additional benefit of the transformer of the present invention is the fact that only a two channel preamplifier circuit is needed while a six channel preamplifier circuit would be necessary to accomplish the same eight channel read/write performance with the conventional rotary transformer.

Thus, the transformer of the present invention provides excellent channel isolation, negligible channel-to-channel variation and a 4–5 dB signal improvement as compared to conventional transformers constructed at the same geometry, employing shorting rings.

The many features and advantages of the rotary transformer of the present invention will be apparent to those of average skill in the art. Numerous variations on the specific teachings set forth herein are readily apparent to one of average skill in the art. All such modifications and advantages are intended to be within the scope of the invention as described herein as defined in the attached claims.

What is claimed is:

1. A transformer, comprising:

a rotor having a plurality of windings, said rotor positioned for rotation about a rotational axis, at least one of said plurality of windings being positioned at a first radial distance from the rotational axis, and at least another of said plurality of windings being positioned at a second, different radial distance from the rotational axis, each winding only partially extending about the rotational axis; and a stator having at least two windings, a first of said at least two stator windings being provided at said first radial distance, and at least a second of said windings being provided at said second radial distance from said rotational axis;

wherein alternating ones of said plurality of rotor windings inductively couple to alternating ones of said at least two stator windings as said rotor rotates about said axis.

2. The transformer of claim 1 wherein alternating ones of said plurality of rotor windings are provided at said first and second radial distance.

3. A transformer, comprising:

a first stationary element having a first element winding and a second element winding; and a second element having a plurality of windings and being mounted for rotation about a rotational axis, one of said plurality of windings being at a first distance from the axis, and another being at a different second distance from the axis, each of said plurality of windings extending about the rotational axis in an arc which is less than a full circle;

wherein said second element is rotationally positional such that each of the plurality of windings on the second element may be positioned adjacent to one of said first and second windings on said first element, wherein only one of the plurality of windings on the second element interacts with said first or second winding on the first element at a given time.

4. The transformer of claim 3 wherein inductive coupling between said one of said plurality of windings and said first element winding occurs when a changing voltage is supplied to either said one of said plurality of windings or said first element winding.

5. The transformer of claim 3 wherein the second element includes a plurality of sector shaped blades, each blade including one of the plurality of windings positioned at the first or the second distance from the rotational axis.

6. The transformer of claim 5 wherein alternating ones of the plurality of windings are placed on ones of the blades at the first distance and the second distance, respectively.

7. A rotary transformer, comprising a fixed stator element, having a semi-circular shape, having a first and second stator windings positioned at a first radial distance and a second, different radial distance, respectively, from a rotational axis; and a rotor, having at least two semi-circular shaped elements, positioned adjacent the stator element, rotating about the rotational axis, and including at least two windings respectively positioned at the first and second radial distances from the rotational axis, each semi-circular-shaped element including at least one of said windings, each semi-circular-shaped element substantially separated from the other of said elements by an air gap.

8. The rotary transformer of claim 7 wherein the stator includes at least one winding positioned such that one of said at least two windings on the rotor is positioned adjacent thereto at a given time and separated by an air gap.

9. The rotary transformer of claim 8 wherein the rotor includes eight semi-circular-shaped elements, each element having a winding thereabout.

10. A rotary transformer, comprising:

a stator having a first winding and a second winding; and a rotor, mounted for rotation about an axis relative to the stator, the rotor having at least a first winding and a second winding positioned at a first distance and a second, different distance from the axis, respectively, each winding extending about the axis in an arc which is less than a full circle, the rotor rotating such that the first and second windings on the rotor interact with the first and second windings on the stator, respectively, when a changing voltage is present in one of said first or second rotor windings or the first or second stator windings, to induce a voltage in the rotor winding or one of the stator windings, respectively.

11. The rotary transformer of claim 10 wherein the stator includes a semi-circular shaped member having the at least one of said first or second windings positioned thereabout, the member positioned adjacent to the rotor.

12. The rotary transformer of claim 11 wherein the rotor includes a plurality of semi-circular shaped members, each having an outer arcuate edge.

13. The rotary transformer of claim 12 wherein alternating ones of the plurality of semi-circular shaped members have the outer arcuate edge at a third distance from said rotational axis and a fourth distance from said rotational axis.

14. The rotary transformer of claim 13 wherein said alternating ones of the semi-circular shaped members having an outer arcuate edge at the third distance from the rotational axis have a winding positioned at the first distance from the rotational axis, and said ones of the semi-circular shaped members having an outer edge at the fourth distance from the rotational axis have a winding positioned at the second distance from the rotational axis.

15. The rotary transformer of claim 14 wherein the third distance is greater than the second distance.

16. A rotary transformer for use in a recording device wherein a number of read and write currents are transferred from a stationary element to a rotating element, comprising:

a rotating element having an axis of rotation and including four read channel blades, each blade having a planar surface defining a 45° semicircle, the blade having a winding provided about the blade at a first radius from the axis of rotation, each blade having an outer arcuate edge at a second, different radius from said axis, and four write channel blades, each blade having a planar surface defining a 45° semicircle, each blade having a winding provided about the blade at a third radius, different from said first and second radii, from the axis of rotation, and being interposed between ones of the read channel blades such that the rotating element has alternating read and write channel blades, the write channel blades having an outer arcuate edge defined by a fourth radius, different from said first, second, and third radii, from the axis of rotation; and a stationary element, having an arcuate shape defined by a planar surface having a first and second stationary windings at distances equal to the first and third radii from the axis of rotation, positioned adjacent the rotating element in close proximity thereto such that each planar surface defined by the blades is parallel to the planar surface defined by the stationary element.

17. The transformer of claim 16 wherein each of the blades is separated by a notch.

18. The transformer of claim 16 wherein each of the windings is provided in a separate channel in each of the blades, and in the stator.

19. A rotary transformer having multiple cores, comprising:

a plurality of blades coupled for rotation about a rotational axis, each blade partially extending about the rotational axis and having a separate winding thereon, the winding defining an arc which is less than a full circle, alternating ones of the blades having said winding at a first radius and a second, different radius from the rotational axis; and a stationary element positioned adjacent the blades and parallel thereto, the stationary element having first and second windings positioned at the first radius and the second radius, respectively, the first and second stationary element windings being positioned adjacent to the windings of the blades and separated therefrom by an air gap when the blades are rotated so that the blades are coincident with the stationary element.

20. The rotary transformer of claim 19 wherein said first radius is greater than said second radius, and said alternating ones of said blades having windings at the first radius have an undercut region in said blade at the second radius creating a larger air gap between the undercut region and the stationary element winding at the second radius.

21. A data storage unit, comprising:

a housing;

a rotating head assembly, including a spin motor having a rotational axis and a voice coil actuator, for transferring data to and from a data tape advancing in a longitudinal direction, including a rotating head drum at a forward end of said rotating head assembly;

a plurality of transducers affixed to said rotating head drum and proximate to said data tape for transmitting and receiving data signals; and control means for providing information to said plurality of transducers and providing control signals to said spin motor and said voice coil actuator, the control means including a preamplifier circuit driving a read current or a write current to each of the plurality of heads; and a rotary transformer including at least two rotating elements rotating about the rotational axis of the drum, a first of the rotating elements including a first winding positioned at a first radial distance from the axis of the drum, and a second of the rotating elements including a second winding positioned at a second, different radial distance from the axis of the drum, each winding defining a partial arc about rotational axis, and a stationary element positioned adjacent the rotating elements, the stationary element having a first winding positioned at the first radial distance from the axis and a second winding positioned at the second radial distance from the axis, such that the first and second stator windings and the first and second rotor windings only interact when one of the first or second rotor windings is positioned adjacent the respective first and second stator winding.

* * * * *